United States Patent
Brégier et al.

(10) Patent No.: US 12,499,678 B2
(45) Date of Patent: Dec. 16, 2025

(54) UNSUPERVISED PRE-TRAINING OF GEOMETRIC VISION MODELS

(71) Applicant: NAVER CORPORATION, Gyeonggi-do (KR)

(72) Inventors: Romain Brégier, Grenoble (FR); Yohann Cabon, Montbonnot-Saint-Martin (FR); Thomas Lucas, Grenoble (FR); Jérôme Revaud, Meylan (FR); Philippe Weinzaepfel, Montonnot-Saint-Martin (FR); Boris Chidlovskii, Meylan (FR); Vincent Leroy, Laval (FR); Leonid Antsfeld, Saint Ismier (FR); Gabriela Csurka Khedari, Crolles (FR)

(73) Assignee: NAVER CORPORATION, Gyeonggi-Do (KR)

( * ) Notice: Subject to any disclaimer, the term of this patent is extended or adjusted under 35 U.S.C. 154(b) by 313 days.

(21) Appl. No.: 18/230,414

(22) Filed: Aug. 4, 2023

(65) Prior Publication Data
US 2024/0135695 A1 Apr. 25, 2024

(30) Foreign Application Priority Data
Oct. 11, 2022 (EP) .................................... 22306534

(51) Int. Cl.
*G06V 10/82* (2022.01)
*G06N 3/0455* (2023.01)
(Continued)

(52) U.S. Cl.
CPC ........... *G06V 10/82* (2022.01); *G06N 3/0455* (2023.01); *G06N 3/088* (2013.01); *G06T 7/70* (2017.01);
(Continued)

(58) Field of Classification Search
CPC .... G06V 10/82; G06V 10/44; G06V 10/7753; G06V 10/776; G06V 10/80; G06V 10/96;
(Continued)

(56) References Cited

U.S. PATENT DOCUMENTS

| 2019/0228267 A1* | 7/2019 | Singh | G06N 3/045 |
| 2019/0228313 A1* | 7/2019 | Lee | G06T 7/20 |

(Continued)

FOREIGN PATENT DOCUMENTS

| CA | 3090504 A1 * | 2/2021 | G06N 3/045 |
| CN | 112990218 A * | 6/2021 | G06N 3/045 |

(Continued)

OTHER PUBLICATIONS

U.S. Appl. No. 18/239,739, filed Aug. 29, 2023, Philippe Weinzaepfel.
(Continued)

*Primary Examiner* — Charlotte M Baker

(57) ABSTRACT

A method includes: performing unsupervised pre-training of a model, the model including and a decoder including: obtaining a first image and a second image under different conditions or from different viewpoints; encoding, by the encoder, the first image into a representation of the first image and the second image into a representation of the second image; transforming the representation of the first image into a transformed representation; decoding, by the decoder, the transformed representation into a reconstructed image, where the transforming of the representation of the first image and the decoding of the transformed representation is based on the representation of the first image and the representation of the second image; and adjusting one or more parameters of at least one of the encoder and the decoder based on minimizing a loss; and fine-tuning the model, initialized with a set of task specific encoder parameters, for a geometric vision task.

24 Claims, 10 Drawing Sheets

(51) Int. Cl.

| | |
|---|---|
| *G06N 3/088* | (2023.01) |
| *G06T 7/70* | (2017.01) |
| *G06V 10/44* | (2022.01) |
| *G06V 10/774* | (2022.01) |
| *G06V 10/776* | (2022.01) |
| *G06V 10/80* | (2022.01) |
| *G06V 10/96* | (2022.01) |
| *G06V 20/64* | (2022.01) |
| *G06V 40/10* | (2022.01) |

(52) U.S. Cl.
CPC .......... *G06V 10/44* (2022.01); *G06V 10/7753* (2022.01); *G06V 10/776* (2022.01); *G06V 10/80* (2022.01); *G06V 10/96* (2022.01); *G06V 20/64* (2022.01); *G06V 40/10* (2022.01); *G06T 2207/20081* (2013.01); *G06T 2207/30196* (2013.01)

(58) Field of Classification Search
CPC ...... G06V 20/64; G06V 40/10; G06N 3/0455; G06N 3/088; G06N 3/0895; G06N 3/09; G06N 3/096; G06N 20/20; G06N 3/084; G06T 7/70; G06T 2207/20081; G06T 2207/30196; G06T 2207/20084; G06T 7/50
USPC ......................................................... 382/155
See application file for complete search history.

(56) References Cited

U.S. PATENT DOCUMENTS

| | | | | |
|---|---|---|---|---|
| 2021/0060433 | A1* | 3/2021 | Projansky | A63F 13/92 |
| 2024/0037940 | A1* | 2/2024 | Wu | G06V 20/41 |
| 2024/0078726 | A1* | 3/2024 | Weber | G06V 40/172 |

FOREIGN PATENT DOCUMENTS

| | | | | |
|---|---|---|---|---|
| CN | 116012903 | A * | 4/2023 | |
| GB | 2585197 | A * | 1/2021 | G06T 7/85 |
| KR | 20210053202 | A * | 5/2021 | G06V 30/19167 |

OTHER PUBLICATIONS

Alaaeldin El-Nouby, Gautier Izacard, Hugo Touvron, Ivan Laptev, Herve Jegou, and Edouard Grave. Are Large-scale Datasets Necessary for Self-Supervised Pre-training? arXiv preprint arXiv:2112.10740, 2021.

Alexander Kapitanov, Andrey Makhlyarchuk, and Karina Kvanchiani. Hagrid—hand gesture recognition image, arXiv:2206.08219v1; Jun. 16, 2022.

Alexei Baevski, Wei-Ning Hsu, Qiantong Xu, Arun Babu, Jiatao Gu, and Michael Auli. data2vec: A General Framework for Self-supervised Learning in Speech, Vision and Language. arXiv preprint arXiv:2202.03555, 2022.

Angjoo Kanazawa, Michael J Black, David W Jacobs, and Jitendra Malik. End-to-end recovery of human shape and pose. In CVPR, 2018.

Arora, Vaibhav and Antsfeld, Leonid and Chidlovskii, Boris and Csurka, Gabriela and Revaud Jerome. CroCo: Self-Supervised Pre-training for 3D Vision Tasks by Cross-View Completion. In NeurIPS, 2022.

Sara Atito, Muhammad Awais, and Josef Kittler. SiT: Self-supervised vision Transformer. arXiv preprint arXiv:2104.03602, 2021.

Catalin Ionescu, Dragos Papava, Vlad Olaru, and Cristian Sminchisescu. Human3.6M: Large scale datasets and predictive methods for 3D human sensing in natural environments. IEEE Trans. PAMI, 2014.

Chen Wei, Haoqi Fan, Saining Xie, Chao-Yuan Wu, Alan Yuille, and Christoph Feichtenhofer. Masked Feature Prediction for Self-Supervised Visual Pre-Training. In CVPR, 2022.

Christian Zimmermann, Duygu Ceylan, Jimei Yang, Bryan Russell, Max Argus, and Thomas Brox. Freihand: A dataset for markerless capture of hand pose and shape from single rgb images. In ICCV, 2019.

Christian Zimmermann, Max Argus, and Thomas Brox. Contrastive representation learning for hand shape estimation. In Pattern Recognition, 2021.

Christoph Feichtenhofer, Haoqi Fan, Yanghao Li, and Kaiming He. Masked autoencoders as spatiotemporal learners. NeurIPS, 2022.

Dai et al., "Scannet: Richly-annotated 3d reconstructions of indoor scenes", CVPR, 2017.

Dosovitskiy et al., An Image is Worth 16x16 Words: Transformers for Image Recognition at Scale, ICLR, 2021.

Dushyant Mehta, Helge Rhodin, Dan Casas, Pascal Fua, Oleksandr Sotnychenko, Weipeng Xu, and Christian Theobalt. Monocular 3d human pose estimation in the wild using improved CNN supervision. In 3DV, 2017.

European Search Report for European Application No. 22306534.3 dated May 12, 2023.

Fangzhou Hong, Liang Pan, Zhongang Cai, and Ziwei Liu. Versatile multi-modal pre-training for human-centric perception. arXiv preprint arXiv:2203.13815, 2022.

Fisher Yu, Ari Seff, Yinda Zhang, Shuran Song, Thomas Funkhouser, and Jianxiong Xiao. Lsun: Construction of a large-scale image dataset using deep learning with humans in the loop. arXiv preprint arXiv:1506.03365, 2015.

Gregory Rogez, James S Supancic, and Deva Ramanan. Understanding everyday hands in action from rgb-d images. In ICCV, 2015.

Grant Van Horn, Oisin Mac Aodha, Yang Song, Yin Cui, Chen Sun, Alex Shepard, Hartwig Adam, Pietro Perona, and Serge Belongie. The inaturalist species classification and detection dataset. In CVPR, 2018.

Gul Varol, Javier Romero, Xavier Martin, Naureen Mahmood, Michael J. Black, Ivan Laptev, and Cordelia Schmid. Learning from synthetic humans. In CVPR, 2017.

Gyeongsik Moon, Hongsuk Choi, and Kyoung Mu Lee. Accurate 3d hand pose estimation for whole-body 3d human mesh estimation. In CVPR, 2022.

Gyeongsik Moon, Shoou-I Yu, He Wen, Takaaki Shiratori, and Kyoung Mu Lee. Interhand2.6m: A dataset and baseline for 3d interacting hand pose estimation from a single rgb image. In ECCV, 2020.

Hanbyul Joo, Natalia Neverova, and Andrea Vedaldi. Exemplar fine-tuning for 3d human model fitting towards in-the wild 3d human pose estimation. In 3DV, 2021.

Helge Rhodin et al: "Unsupervised Geometry-Aware Representation for 3D Human Pose Estimation" Cornell University, ARXIV XP080867288, Apr. 3, 2018.

Jae Shin Yoon, Zhixuan Yu, Jaesik Park, and Hyun Soo Park. HUMBI: A large multiview dataset of human body expressions. In CVPR, 2021.

Hongsuk Choi, Gyeongsik Moon, and Kyoung Mu Lee. Pose2mesh: Graph convolutional network for 3D human pose and mesh recovery from a 2d human pose. In ECCV, 2020.

Zhixuan Yu, Jae Shin Yoon, In Kyu Lee, Prashanth Venkatesh, Jaesik Park, Jihun Yu, and Hyun Soo Park. HUMBI: A large multiview dataset of human body expressions. In CVPR, 2020.

Jacob Devlin, Ming-Wei Chang, Kenton Lee, and Kristina Toutanova. Bert: Pretraining of deep bidirectional transformers for language understanding. In NAACLHLT, 2019.

Andrew Jaegle, Sebastian Borgeaud, Jean-Baptiste Alayrac, Carl Doersch, Catalin Ionescu, David Ding, Skanda Koppula, Daniel Zoran, Andrew Brock, Evan Shelhamer, Olivier Hénaff, Matthew M. Botvinick, Andrew Zisserman, Oriol Vinyals, João Carreira, Perceiver IO: A General Architecture for Structured Inputs & Outputs, ICLR, 2022.

Javier Romero, Dimitrios Tzionas, and Michael J Black. Embodied hands: Modeling and capturing hands and bodies together. arXiv preprint arXiv:2201.02610, 2022.

(56) References Cited

OTHER PUBLICATIONS

Jean-Bastien Grill, Florian Strub, Florent Altche, Corentin Tallec, Pierre H. Richemond, Elena Buchatskaya, Carl Doersch, Bernardo Avila Pires, Zhaohan Guo, Mohammad Gheshlaghi Azar, Bilal Piot, Koray Kavukcuoglu, Remi Munos, and Michal Valko. Bootstrap Your Own Latent—A New Approach to Self-Supervised Learning. In NeurIPS, 2020.
Jia Deng, Wei Dong, Richard Socher, Li-Jia Li, Kai Li, and Li Fei-Fei. Imagenet: A large-scale hierarchical image database. In CVPR. IEEE, 2009.
Joao Carreira, Eric Noland, Chloe Hillier, and Andrew Zisserman. A short note on the kinetics-700 human action dataset. arXiv preprint arXiv:1907.06987, 2019.
Kaiming He, Xinlei Chen, Saining Xie, Yanghao Li, Piotr Dollar, and Ross Girshick. Masked Autoencoders are Scalable Vision Learners. In CVPR, 2021.
Ke Gong, Xiaodan Liang, Yicheng Li, Yimin Chen, Ming Yang, and Liang Lin. Instance-level human parsing via part grouping network. In ECCV, 2018.
Kevin Lin, Lijuan Wang, and Zicheng Liu. End-to-end human pose and mesh reconstruction with transformers. In CVPR, 2021.
Liang Zheng, Zhi Bie, Yifan Sun, Jingdong Wang, Chi Su, Shengjin Wang, and Qi Tian. Mars: A video benchmark for large-scale person re-identification. In ECCV, 2016.
Liu et al., "On the variance of the adaptive learning rate and beyond" ICLR, 2020.
Long Zhao, Yuxiao Wang, Jiaping Zhao, Liangzhe Yuan, Jennifer J Sun, Florian Schroff, Hartwig Adam, Xi Peng, Dimitris Metaxas, and Ting Liu. Learning view-disentangled human pose representation by contrastive cross-view mutual information maximization. In CVPR, 2021.
Loshchilov and Hutter, "Decoupled Weight Decay Regularization", ICLR, 2019.
Luca Schmidtke, Athanasios Vlontzos, Simon Ellershaw, Anna Lukens, Tomoki Arichi, and Bernhard Kainz. Unsupervised human pose estimation through transforming shape templates. In CVPR, 2021.
Mahmoud Assran, Mathilde Caron, Ishan Misra, Piotr Bojanowski, Florian Bordes, Pascal Vincent, Armand Joulin, Michael Rabbat, and Nicolas Ballas. Masked siamese networks for label-efficient learning. In ECCV, 2022.
Mahmoud Assran, Randall Balestriero, Quentin Duval, Florian Bordes, Ishan Misra, Piotr Bojanowski, Pascal Vincent, Michael Rabbat, and Nicolas Ballas. The hidden uniform cluster prior in self-supervised learning. In ICLR, 2023.
Manolis Savva, Abhishek Kadian, Oleksandr Maksymets, Yili Zhao, Erik Wijmans, Bhavana Jain, Julian Straub, Jia Liu, Vladlen Koltun, Jitendra Malik, Devi Parikh, and Dhruv Batra. Habitat: A Platform for Embodied AI Research. In ICCV, 2019.
Mark Chen, Alec Radford, Rewon Child, Jeffrey Wu, Heewoo Jun, David Luan, and Ilya Sutskever. Generative Pretraining From Pixels. In ICML, 2020.
Mathilde Caron, Hugo Touvron, Ishan Misra, Herve Jegou, Julien Mairal, Piotr Bojanowski, and Armand Joulin. Emerging Properties in Self-Supervised Vision Transformers. In ICCV, 2021.
Mathilde Caron, Ishan Misra, Julien Mairal, Priya Goyal, Piotr Bojanowski, and Armand Joulin. Unsupervised learning of visual features by contrasting cluster assignments. In NeurIPS, 2020.
Mathilde Caron, Piotr Bojanowski, Armand Joulin, and Matthijs Douze. Deep clustering for unsupervised learning of visual features. In ECCV, 2018.
Matthew Loper, Naureen Mahmood, Javier Romero, Gerard Pons-Moll, and Michael J Black. Smpl: A skinned multiperson linear model. ACM TOG, 2015.
Natalia Neverova, David Novotny, Marc Szafraniec, Vasil Khalidov, Patrick Labatut, and Andrea Vedaldi. Continuous surface embeddings. In NeurIPS, 2020.
Naureen Mahmood, Nima Ghorbani, Nikolaus F. Troje, Gerard Pons-Moll, and Michael J. Black. Amass: Archive of motion capture as surface shapes. In ICCV, 2019.

Nikos Kolotouros, Georgios Pavlakos, Michael J Black, and Kostas Daniilidis. Learning to reconstruct 3D human pose and shape via model-fitting in the loop. In ICCV, 2019.
Olga Russakovsky, Jia Deng, Hao Su, Jonathan Krause, Sanjeev Satheesh, Sean Ma, Zhiheng Huang, Andrej Karpathy, Aditya Khosla, Michael Bernstein, Alexander C. Berg, and Li Fei-Fei. ImageNet Large Scale Visual Recognition Challenge. IJCV, 2015.
Paszke et al., "PyTorch: An Imperative Style, High-Performance Deep Learning Library", NeurIPS, 2019.
Pathak et al., "Context Encoders: Feature Learning by Inpainting", CVPR, 2016.
Philippe Weinzaepfel et al.: "CroCo: Self-Supervised Pre-training for 3D Vision Tasks by Cross-View Completion" Cornell University, Oct. 19, 2022.
Ramakrishnan et al., "Habitat-matterport 3d dataset (HM3d): 1000 large-scale 3d environments for embodied AI", NeurIPS datasets and benchmarks, 2021.
Ranjay Krishna, Yuke Zhu, Oliver Groth, Justin Johnson, Kenji Hata, Joshua Kravitz, Stephanie Chen, Yannis Kalantidis, Li-Jia Li, David A Shamma, et al. Visual genome: Connecting language and vision using crowdsourced dense image annotations. IJCV, 2017.
Rasmus Rothe, Radu Timofte, and Luc Van Gool. Dex: Deep expectation of apparent age from a single image. In ICCVW, 2015.
Rene Ranftl, Alexey Bochkovskiy, and Vladlen Koltun. Vision Transformers for Dense Prediction. In ICCV, 2021.
Riza Alp Guler, Natalia Neverova, and Iasonas Kokkinos. Densepose: Dense human pose estimation in the wild. In CVPR, 2018.
Roberto Martin-Martin, Mihir Patel, Hamid Rezatofighi, Abhijeet Shenoi, JunYoung Gwak, Eric Frankel, Amir Sadeghian, and Silvio Savarese. Jrdb: A dataset and benchmark of egocentric robot visual perception of humans in built environments. IEEE trans. PAMI, 2021.
Romain Bregier: "Deep Regression on Manifolds: A 3D Rotation Case Study" Cornell University, Oct. 12, 2021.
Roman Bachmann, David Mizrahi, Andrei Atanov, and Amir Zamir. MultiMAE: Multi-modal Multi-task Masked Autoencoders. In ECCV, 2022.
Schönemann, A generalized solution of the orthogonal Procrustes problem, Psychometrika, 1966.
Senthil Purushwalkam and Abhinav Gupta. Demystifying contrastive self-supervised learning: Invariances, augmentations and dataset biases. In NeurIPS, 2020.
Shreyas Hampali, Mahdi Rad, Markus Oberweger, and Vincent Lepetit. Honnotate: A method for 3d annotation of hand and object poses. In CVPR, 2020.
Shuhei Tsuchida, Satoru Fukayama, Masahiro Hamasaki, and Masataka Goto. Aist dance video database: Multi-genre, multi-dancer, and multi-camera database for dance information processing. In ISMIR, 2019.
Straub et al., "The Replica dataset: A digital replica of indoor spaces", arXiv:1906.05797, 2019.
Szot et al., "Habitat 2.0: Training home assistants to rearrange their habitat", NeurIPS, 2021.
Timo von Marcard, Roberto Henschel, Michael Black, Bodo Rosenhahn, and Gerard Pons-Moll. Recovering accurate 3d human pose in the wild using imus and a moving camera. In ECCV, 2018.
Ting Chen, Simon Kornblith, Mohammad Norouzi, and Geoffrey Hinton. A simple framework for contrastive learning of visual representations. In ICML, 2020.
Tom Brown, Benjamin Mann, Nick Ryder, Melanie Subbiah, Jared D Kaplan, Prafulla Dhariwal, Arvind Neelakantan, Pranav Shyam, Girish Sastry, Amanda Askell, et al. Language models are few-shot learners. Advances in neural information processing systems, 33:1877-1901, 2020.
Tomas Jakab, Ankush Gupta, Hakan Bilen, and Andrea Vedaldi. Self-supervised learning of interpretable keypoints from unlabelled videos. In CVPR, 2020.
Tomas Jakab, Ankush Gupta, Hakan Bilen, and Andrea Vedaldi. Unsupervised learning of object landmarks through conditional image generation. NeurIPS, 2018.
Tsung-Yi Lin, Michael Maire, Serge Belongie, James Hays, Pietro Perona, Deva Ramanan, Piotr Dollar, and C Lawrence Zitnick. Microsoft coco: Common objects in context. In ECCV, 2014.

(56) References Cited

OTHER PUBLICATIONS

Umar Iqbal, Anton Milan, and Juergen Gall. Posetrack: Joint multi-person pose estimation and tracking. In CVPR. Apr. 7, 2017.
Umar Iqbal, Kevin Xie, Yunrong Guo, Jan Kautz, and Pavlo Molchanov. Kama: 3d keypoint aware body mesh articulation. In 2021 International Conference on 3D Vision (3DV), pp. 689-699. IEEE, 2021.
Umeyama, Least-squares estimation of transformation parameters between two point patterns, TPAMI, 1991.
Vaswani et al., Attention is all you need, NeurIPS, 2017.
Wandt Bastian et al: "CanonPose: Self-Supervised Monocular 3D Human Pose Estimation in the Wild" IEEE/CVF Conference on Computer Vision and Pattern Recognition, Jun. 20, 2021.
Weiyu Zhang, Menglong Zhu, and Konstantinos G. Derpanis. From actemes to action: A strongly-supervised representation for detailed action understanding. In ICCV, 2013.
Chenxin Tao et al: "Siamese Image Modeling for Self-Supervised Vision Representation Learning" Cornell University, Jul. 5, 2022.
Ziwei Chen, Xiaofeng Wang, Wankou Yang, Qiang Li. Liftedcl: Lifting contrastive learning for human-centric perception. In ICLR, 2023.
Yao Feng, Vasileios Choutas, Timo Bolkart, Dimitrios Tzionas, and Michael J Black. Collaborative regression of expressive bodies using moderation. In 3DV, 2021.
Yufei Xu, Jing Zhang, Qiming Zhang, and Dacheng Tao. Vitpose: Simple vision transformer baselines for human pose estimation. In NeurIPS, 2022.
Zhan Tong, Yibing Song, Jue Wang, and Limin Wang. Videomae: Masked autoencoders are data-efficient learners for self-supervised video pre-training. NeurIPS, 2022.
Zhenda Xie, Zheng Zhang, Yue Cao, Yutong Lin, Jianmin Bao, Zhuliang Yao, Qi Dai, and Han Hu. SimMIM: A Simple Framework for Masked Image Modeling. In CVPR, 2022.
Zhenguang Liu, Runyang Feng, Haoming Chen, ShuangWu, Yixing Gao, Yunjun Gao, and XiangWang. Temporal feature alignment and mutual information maximization for video based human pose estimation. In CVPR, 2022.
Zhirong Wu, Yuanjun Xiong, Stella X. Yu, and Dahua Lin. Unsupervised feature learning via non-parametric instance level discrimination. In CVPR, 2018.
Ziwei Liu, Ping Luo, Xiaogang Wang, and Xiaoou Tang. Large-scale celebfaces attributes (celeba) dataset. Retrieved Feb. 28, 2024.

* cited by examiner

UNSUPERVISED PRE-TRAINING OF GEOMETRIC VISION MODELS

CROSS-REFERENCE TO RELATED APPLICATIONS

This application claims the benefit of European Patent Application No. EP22306534.3 filed on 11 Oct. 2022. The entire disclosure of the application referenced above is incorporated herein by reference.

FIELD

The present disclosure relates to computer-based image analysis, in particular, to systems, methods and computer-readable media for training machine learning models on geometric vision tasks.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Human vision is based on two optical sensors (the eyes) and a highly specialized and effective image analysis engine (the vision related parts of the brain). The image analysis performed by the human brain on the images detected by the eyes allows a human to recognize objects and object edges in images, estimate object distances, and estimate object velocities and future object positions.

These image analysis capabilities are of importance in everyday human activities such as driving a car, operating machines, catching and throwing objects, hitting a nail with a hammer, navigating through a crowd of people, etc.

Computer-based devices may be configured to perform human activities autonomously. One element for achieving this goal is to provide computer-based devices with computer vision, an emulation of human vision.

Similar to the human visual system, a computer vision system may be configured to perform image analysis. A computer vision system may provide a sufficient approximation of the image analysis capabilities of the human brain to allow computer-based devices to perform high-level vision-related tasks such as object and edge recognition, monocular or binocular depth estimation, optical flow estimation, or pose estimation. Some high-level vision-related tasks, such as depth estimation, optical flow estimation or pose estimation, are based on an understanding of the three dimensional (3D) geometry of a depicted scene.

In the following, this kind of high-level vision-related tasks is summarized in the term geometric vision tasks. Computer vision related technology may be used, for example, in self-driving (autonomous) vehicles, autonomous robotic machines, and other devices. However, enhancements in the computer-based performance of geometric vision tasks may also have great impact in other technical fields such as image based diagnostic or image based material testing.

Artificial intelligence (AI) based image analysis may be used in computer vision. In AI-based image analysis, a trained machine learning model is applied to one or more images to extract relevant analytic data for a specific geometric vision task from the one or more images (e.g., a depth map, pairs of corresponding pixels, object velocities, etc.). The quality of the extracted analytic data may depend on the training of the machine learning model.

Typically, a machine learning model includes a large number of learnable parameters. A goal of training the machine learning model is to find a set of parameters, which optimizes the outcome for a specific task on a set of training data. A deviation from an optimum outcome may be expressed as a loss (e.g., the value of a loss function). Finding an optimal set of parameters translates to finding a set of parameters that lead to a minimum value of the loss function. Since the training is based on the deviation of an achieved result to an optimal result for a given task to minimize the loss, the AI system may receive some indication of the optimal result in order to improve during the training phase.

Supervised training approaches involve annotated training data, which may include ground truth data indicating the optimum outcome for a specific task. Since annotating the training data may be a significant effort, the amount of available annotated data for a specific task is limited. The problem of limited training data can be alleviated by unsupervised training approaches.

Unsupervised training may use unannotated training data without explicitly specified ground truth data and can therefore take advantage of large data repositories of unannotated training data (e.g., image databases or internet text repositories). However, unsupervised training may be limited to tasks for which the optimal result of the task can be determined without explicit annotation of ground-truth data.

Even if the task for which a machine learning model is to be trained does not support unsupervised training, combining unsupervised training and supervised training can provide an enhanced training result. Unsupervised pre-training may be used for various high-level tasks in computer vision. In a second training step, the pre-trained machine learning models (which may be referred to as foundation models) can be fine-tune trained on small annotated datasets and perform well on some tasks compared to supervised learning approaches, and outperform supervised learning approaches when large annotated datasets are not available.

Unsupervised learning may perform well in a number of high-level computer vision tasks, such as image classification or object detection. These models enable the use of additional image data without requiring additional labels. One example of unsupervised learning involves contrastive learning, which constructs a pretext task by learning model outputs that are invariant to data augmentations. Masked Image Modeling (MIM) may be an alternative for unsupervised learning. These models may be trained using an auto-completion pretext task: an encoder encodes a partial view of an image input, obtained by splitting it into patches and masking some of them, into a latent representation. The invisible patches may then be predicted by the decoder based on the latent representation. These methods are examples of so-called self-supervised learning, which is a specific approach to unsupervised learning. The tasks on which these existing self-supervised methods excel may include single-view semantic oriented tasks, such as image classification or semantic segmentation. However, 3D tasks (e.g., geometric vision tasks) where the 3D geometry of the depicted scene becomes relevant may be difficult to handle.

SUMMARY

In order to overcome the above deficiencies, computer-readable media as well as computer-implemented methods and systems for training a task specific machine learning model for a downstream geometric vision task are presented. One approach is based on unsupervised pre-training specifically adapted by a module to geometric vision downstream tasks by rewarding the use of multi-view geometry cues. The pre-training may only include pairs of unannotated images depicting the same scene from different viewpoints (points of view) and/or under different conditions (e.g., lighting). The pretext task is specifically adapted such that the pretext model has to learn an understanding of the spatial relationship between the two images and thereby about the 3D geometry of the depicted scene to correctly perform the pretext task. The pretext model includes an encoder and a decoder. The encoder encodes each of the two images of an image pair into a respective (e.g., vector or matrix) representation of the image in a representation space. Such image representations may also be called latent representations and the respective representation space is also known as latent space. One of the image representations is then transformed in the representation space, and the transformed representation is decoded into a reconstructed image.

In an example of the unsupervised pre-training, one image of the pair is partially masked, and the masked content is predicted from the second image as well as from the visible content of the first one. This approach is referred to as cross-view completion (CroCo) pre-training. In cross-view completion, the ambiguity, which is introduced through the masking of parts of one image, can be resolved by deducing the masked content from the other unmasked image, provided some understanding of the spatial relationship between the two images.

In an example of the unsupervised pre-training, the representation of one of the images is transformed in the representation space to align with the representation of the other image. This approach is referred to as cross-view alignment (Caiman) pre-training. In cross-view alignment, the transformed representation of the first image is decoded in a reconstructed image as a prediction of the second image. Solving this task may involve some understanding of the geometry of the scene and of how its appearance changes across views.

The presented pre-training approaches do not require any supervision, e.g., ground-truth correspondences between training images. The disclosed approaches involve adaptation to learn lower-level geometric cues from unlabeled data. Accordingly, pretext models can be pre-trained on large unannotated datasets such that the pre-trained pretext models (foundation models) learn a general understanding of 3D geometry of a depicted scene and can therefore be efficiently fine-tuned on multiple geometric vision tasks.

In an embodiment, a machine learning method of training a task specific machine learning model for a downstream geometric vision task is provided. The method includes: performing unsupervised pre-training of a pretext machine learning model, the pretext machine learning model including an encoder having a set of encoder parameters and a decoder having a set of decoder parameters; constructing a task specific machine leaning model for a downstream geometric vision task based on the pre-trained pretext machine learning model, the task specific machine learning model including a task specific encoder having a set of task specific encoder parameters; initializing the set of task specific encoder parameters with the set of encoder parameters of the pre-trained pretext machine learning model; and fine-tuning the task specific machine learning model, initialized with the set of encoder parameters, for the downstream geometric vision task. The pre-training of the pretext machine learning model includes: obtaining a pair of unannotated images including a first image and a second image, where the first and second images depict a same scene and are taken under different conditions or from different viewpoints; encoding, by the encoder, the first image into a representation of the first image and the second image into a representation of the second image; transforming the representation of the first image into a transformed representation; decoding, by the decoder, the transformed representation into a reconstructed image, where the transforming of the representation of the first image and/or the decoding of the transformed representation is based on the representation of the first image and representation of the second image; and adjusting the encoder and the decoder by adjusting the sets of encoder and decoder parameters based on minimizing a loss function or to minimize the loss function.

In a feature, the unsupervised pre-training is a cross-view alignment pre-training of the pretext machine learning model, and the transforming of the representation of the first image includes applying a transformation to the representation of the first image to determine the transformed representation, the transformation being determined based on the representation of the first image and the representation of the second image such that the transformed representation approximates (e.g., aligns with) the representation of the second image. The loss function may be based on a metric quantifying a difference between the reconstructed image and the second image and/or a metric quantifying a difference between the transformed representation and the representation of the second image.

In a feature, the unsupervised pre-training is a cross-view completion pre-training of the pretext machine learning model and the performing of the cross-view completion pre-training of the pretext machine learning model further includes: splitting the first image into a first set of non-overlapping patches and the second image into a second set of non-overlapping patches; and masking a plurality of patches of the first set of patches. The encoding of the first image into the representation of the first image includes encoding, by the encoder, each remaining unmasked patch of the first set of patches into a corresponding representation of the respective unmasked patch, thereby generating a first set of patch representations. The encoding of the second image into the representation of the second image includes encoding, by the encoder, each patch of the second set of patches into a corresponding representation of the respective patch, thereby generating a second set of patch representations. The decoding of the transformed representation into the reconstructed image comprises, generating, by the decoder, for each masked patch of the first set of patches, a predicted reconstruction for the respective masked patch based on the first and second sets of patch representations. The loss function may be based on a metric quantifying the difference between each masked patch and its respective predicted reconstruction.

In a feature, a machine learning method for generating prediction data according to a downstream geometric vision task is provided which fuses cross-view alignment pre-training and cross-view completion pre-training. The method may include: training a first task specific machine learning model for the downstream geometric vision task using cross-view alignment pre-training of a first pretext machine learning model; training a second task specific machine learning model for the downstream geometric vision task using cross-view completion pre-training of a second pretext machine learning model; generating first prediction data according to the downstream geometric vision task by applying the trained first task specific machine learning model to at least one image; generating second prediction data according to the geometric vision task by applying the trained second task specific machine learning model to the at least one image; determining a first confidence value for the first prediction data and a second confidence value for the second prediction data; and generating resulting prediction data according to the geometric vision task by fusing the first and second prediction data based on the first and second confidence values. The method may include repeating unsupervised pre-training of pretext machine learning for a first pretext machine learning model and a second pretext machine learning model prior to fusing the first pretext machine learning model and the second pretext machine learning model in a task specific machine learning model. Repeating the unsupervised pre-training comprises pre-training the first pretext machine learning model using cross-view completion pre-training and pre-training the second pretext machine learning model using cross-view alignment pre-training.

In a feature, a method includes a computer-implemented method for performing a geometric vision task is provided. The method includes receiving one or more input images, and processing a first input image and, depending on the geometric vision task, a second input image with a neural network trained according to any of the computer-implemented methods described herein. The trained neural network generates an output for the geometric vision task. In a feature, the geometric vision task is relative pose estimation and the output is the relative motion between the first input image and the second input image (e.g., involving the transformation between the two images—relative rotation and translation between the views of the images). In a feature, the geometric vision task is depth estimation and the output is the distance relative to a camera; depending on the depth estimation method, a depth map depicting a scene may be determined from either the first input image (a monocular view of a scene) or from the first input image and the second input image (a binocular view of a scene). In a third embodiment, the geometric vision task is optical flow estimation and the output is the motion of identified visual feature(s) of a scene depicted between the first input image and the second input image.

In a feature, one or more computer-readable media having computer-readable instructions stored thereon are provided. When executed by one or more processors, the computer-readable instructions cause the one or more processors to perform the methods described herein.

In a feature, a system includes one or more processors and memory. The memory includes computer-executable instructions that, when executed by the one or more processors, cause the one or more processors to perform the computer-implemented methods described herein.

In a feature, a computer-implemented machine learning method of training a task specific machine learning model for a downstream geometric vision task is described. The method includes: performing unsupervised pre-training of a machine learning model, the machine learning model comprising an encoder having a set of encoder parameters and a decoder having a set of decoder parameters, where the performing of the unsupervised pre-training of the machine learning model includes: obtaining a pair of unannotated images including a first image and a second image, where the first and second images depict a same scene and are taken under different conditions or from different viewpoints; encoding, by the encoder, the first image into a representation of the first image and the second image into a representation of the second image; transforming the representation of the first image into a transformed representation; decoding, by the decoder, the transformed representation into a reconstructed image, where the transforming of the representation of the first image and the decoding of the transformed representation is based on the representation of the first image and the representation of the second image; and adjusting one or more parameters of at least one of the encoder and the decoder based on minimizing a loss; constructing the task specific machine learning model for the downstream geometric vision task based on the pre-trained machine learning model, the task specific machine learning model including a task specific encoder having a set of task specific encoder parameters; initializing the set of task specific encoder parameters with the set of encoder parameters of the pre-trained machine learning model; and fine-tuning the task specific machine learning model, initialized with the set of task specific encoder parameters, for the downstream geometric vision task.

In further features, the unsupervised pre-training of the machine learning model is a cross-view alignment pre-training, and wherein the transforming of the representation of the first image includes applying a transformation to the representation of the first image to generate the transformed representation, the transformation being determined based on the representation of the first image and the representation of the second image such that the transformed representation approximates the representation of the second image.

In further features, the unsupervised pre-training of the machine learning model is a cross-view alignment pre-training, and wherein the loss is based on a metric quantifying a difference between the reconstructed image and the second image.

In further features, the unsupervised pre-training of the machine learning model is a cross-view alignment pre-training, and wherein the loss is based on a metric quantifying a difference between the transformed representation and the representation of the second image.

In further features, the representation of the first image is a first set of n vectors $\{x_{1,i}\}_{i=1\ldots n}$, each $x_{1,i} \in \mathbb{R}^K$, where the representation of the second image is a second set of n vectors $\{x_{2,i}\}_{i=1\ldots n}$, each $x_{2,i} \in \mathbb{R}^K$, where the applying of the transformation includes decomposing each vector of the first and second sets of vectors in a D-dimensional equivariant part and a (K−D)-dimensional invariant part and applying a (D×D)-dimensional transformation matrix $\Omega$ to the equivariant part of each vector of the first set of vectors, wherein $0 < D \leq K$.

In further features, the transformation is a D-dimensional rotation and $\Omega$ is a D-dimensional rotation matrix, and $\Omega$ is set based on aligning the equivariant parts of the vectors of the first set of vectors with the equivariant parts of the respective vectors of the second set of vectors.

In further features, the method further includes determining $\Omega$ based on the equation:

$$\Omega = \arg\min_{\hat{\Omega} \in SO(D)} \sum_{i=1}^{n} \left\| \hat{\Omega} x_{1,i}^{equiv} - x_{2,i}^{equiv} \right\|^2$$

where $x_{1,i}^{equiv}$ denotes the equivariant part of vector $x_{1,i}$, $x_{2,i}^{equiv}$ denotes the equivariant part of vector $x_{2,i}$, and SO(D) denotes the D-dimensional rotation group.

In further features, the unsupervised pre-training is a cross-view completion pre-training, and wherein the performing of the cross-view completion pre-training of the machine learning model further includes: splitting the first image into a first set of non-overlapping patches and splitting the second image into a second set of non-overlapping patches; and masking ones of the patches of the first set of patches, where the encoding of the first image into the representation of the first image includes, encoding, by the encoder, each unmasked patch of the first set of patches into a corresponding representation of the respective unmasked patch, thereby generating a first set of patch representations, where the encoding the second image into the representation of the second image includes, encoding, by the encoder, each patch of the second set of patches into a corresponding representation of the respective patch, thereby generating a second set of patch representations, where the decoding of the transformed representation includes, generating, by the decoder, for each masked patch of the first set of patches, a predicted reconstruction for the respective masked patch based on the transformed representation and the second set of patch representations, and where the loss function is based on a metric quantifying the difference between each masked patch and its respective predicted reconstruction.

In further features, the transforming of the representation of the first image into the transformed representation further includes, for each masked patch of the first set of patches, padding the first set of patch representations with a respective learned representation of the masked patch.

In further features, each learned representation includes a set of representation parameters.

In further features, the generating of the predicted reconstruction of a masked patch of the first set of patches includes decoding, by the decoder, the learned representation of the masked patch into the predicted reconstruction of the masked patch, where the decoder receives the first and second sets of patch representations as input data and decodes the learned representation of the masked patch based on the input data, and where the method further includes adjusting the learned representations of the masked patches by adjusting the respective set of representation parameters.

In further features, the adjusting the respective set of representation parameters includes adjusting the set of representation parameters based on minimizing the loss.

In further features, fine-tuning the task specific machine learning model includes performing supervised fine-tuning of the task specific machine learning model.

In further features, the supervised fine-tuning includes: i) applying the task specific machine learning model to one or more annotated images to create output data according to the downstream geometric vision task, where the annotated images are annotated with ground truth data for the downstream geometric vision task; and ii) adjusting the task specific machine learning model by adjusting the set of task specific encoder parameters of the task specific machine learning model based on minimizing a task specific loss, the task specific loss being based on a metric quantifying a difference between the created output data and the ground truth data.

In further features, the method further includes repeating i) and ii) for a predetermined number of times or until a minimum value of the task specific loss is reached.

In further features, the method further includes applying the fine-tuned task specific machine learning model to one or more new images to extract prediction data from the one or more new images for the downstream geometric vision task.

In further features, the downstream geometric vision task is relative pose estimation.

In further features, the applying of the fine-tuned task specific machine learning model includes applying the fine-tuned task specific machine learning model to a new pair of images to extract a relative rotation and a relative translation between the images of the new pair of images as the prediction data, where the images of the pair of new images depict two views of a same scene.

In further features, the downstream geometric vision task is depth estimation.

In further features, the applying of the fine-tuned task specific machine learning model includes applying the fine-tuned task specific machine learning model to one or more new images to extract one or more depth maps from the one or more new images as the prediction data.

In further features, the downstream geometric vision task is optical flow estimation.

In further features, the applying of the fine-tuned task specific machine learning model includes applying the fine-tuned task specific machine learning model to a new image pair including a new first image and a new second image to generate a plurality of pixel pairs as the prediction data, where each pixel pair includes a pixel in the new first image and a corresponding pixel in the new second image, where the new first and second images depict a same scene under different conditions or from different viewpoints.

In a feature, a computer-implemented machine learning method for generating prediction data according to a downstream geometric vision task is described and includes: training a first task specific machine learning model for the downstream geometric vision task using cross-view alignment pre-training of a first machine learning model; training a second task specific machine learning model for the downstream geometric vision task using cross-view completion pre-training of a second pretext machine learning model; generating first prediction data according to the downstream geometric vision task by applying the trained first task specific machine learning model to at least one image; generating second prediction data according to the downstream geometric vision task by applying the trained second task specific machine learning model to the at least one image; determining a first confidence value for the first prediction data and a second confidence value for the second prediction data; and generating resulting prediction data according to the geometric vision task by fusing together the first and second prediction data based on the first and second confidence values.

In a feature, a computing system includes: one or more processors; and memory including code that, when executed by the one or more processors, perform to: perform unsupervised pre-training of a machine learning model, the machine learning model including an encoder having a set of encoder parameters and a decoder having a set of decoder parameters, where the performance of the unsupervised pre-training of the machine learning model includes: obtaining a pair of unannotated images including a first image and a second image, where the first and second images depict a same scene and are taken under different conditions or from different viewpoints; encoding, by the encoder, the first image into a representation of the first image and the second image into a representation of the second image; transforming the representation of the first image into a transformed representation; decoding, by the decoder, the transformed representation into a reconstructed image, where the transforming of the representation of the first image and the decoding of the transformed representation is based on the representation of the first image and the representation of the second image; and adjusting one or more parameters of at least one of the encoder and the decoder based on minimizing a loss; construct the task specific machine learning model for the downstream geometric vision task based on the pre-trained machine learning model, the task specific machine learning model including a task specific encoder having a set of task specific encoder parameters; initialize the set of task specific encoder parameters with the set of encoder parameters of the pre-trained machine learning model; and fine-tune the task specific machine learning model, initialized with the set of task specific encoder parameters, for the downstream geometric vision task.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Described herein are systems, computer-readable media and methods for training a task specific machine learning model for a geometric vision task. For purposes of explanation, numerous examples and specific details are set forth in order to provide a thorough understanding of the described examples. Examples as defined by the claims may include some or all of the features in these examples alone or in combination with other features described below, and may further include modifications and equivalents of the features and concepts described herein. The illustrative embodiments will be described with reference to the drawings, wherein like elements and structures are indicated by like reference numbers.

The present invention relates to methods, systems and computer-readable media for training a machine learning model for a geometric vision task (e.g., a three dimensional (3D) geometric task in computer vision). The training is performed in two phases. In a first phase, the pre-training phase, a pretext machine learning model is trained by a training module on a pretext task without supervision using a training data set including a large number of image pairs (e.g., more than 1000 pairs).

The pretext task may be designed for unsupervised learning of 3D geometry cues from image pairs, where each image of an image pair depicts the same scene but from different viewpoints (points of view) or under different conditions (e.g. a different focal length, different lighting conditions, different seasons). A second, task specific machine learning model is constructed, which is specifically configured for a downstream geometric vision task. The downstream geometric vision task is a high-level 3D geometric task in computer vision for which learning (fine-tuning) may involve supervised training with annotated images. A portion of the parameters of the task specific machine learning model is initialized with values of corresponding parameters of the pre-trained pretext machine learning model. In the second training phase, the fine-tuning phase, the task specific machine learning model is trained by the training module with supervision using a training data set including annotated images.

Figure 1:
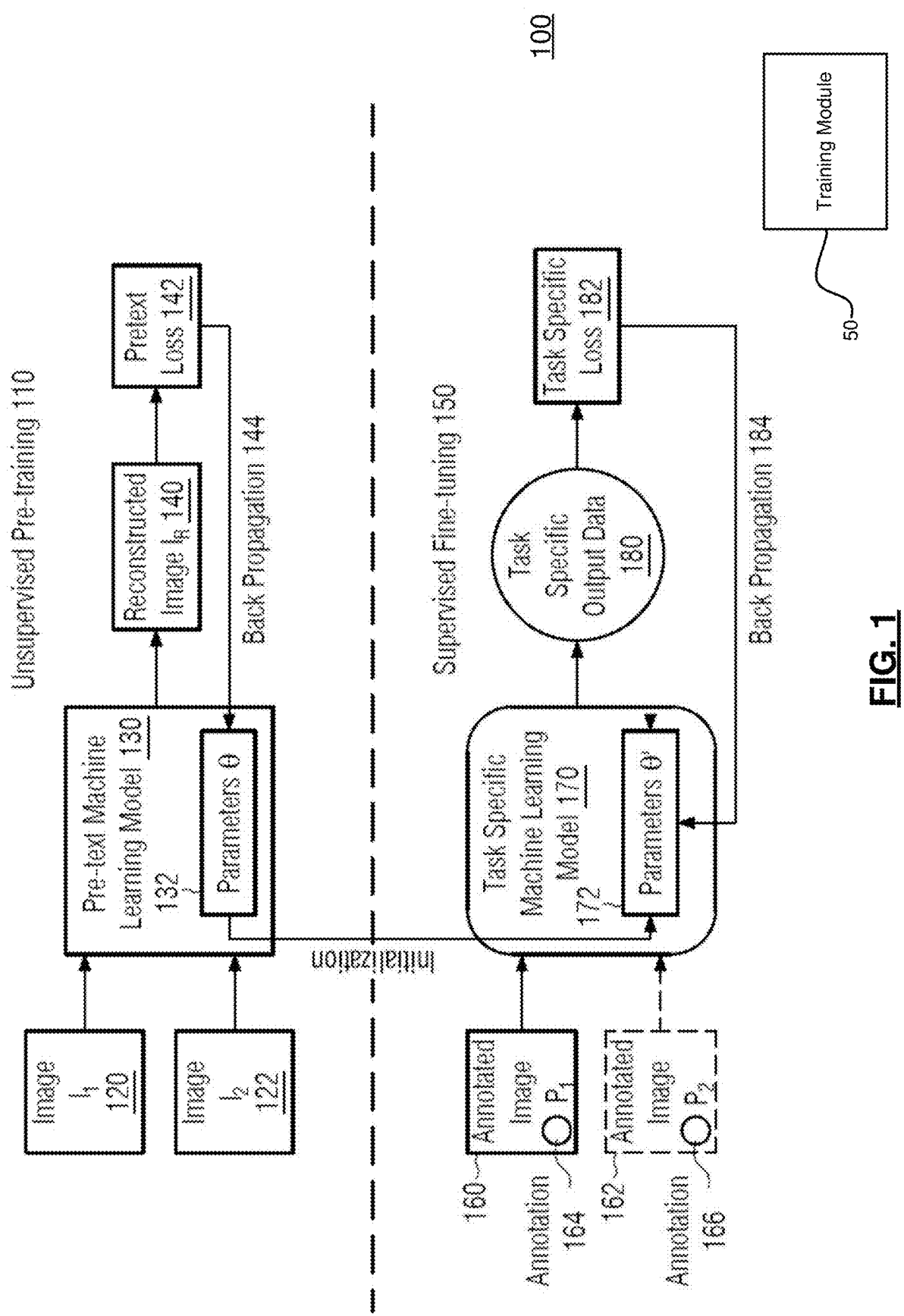
FIG. 1 illustrates a functional block diagram for an example procedure for training a machine learning model for a geometric vision task.

FIG. 1 includes a functional block diagram of an example implementation of the herein described two-phase training process performed by a training module 50 for a machine learning model. The training starts with the training module 50 performing an unsupervised pre-training 110 of a pretext learning model 130 on the pretext task. The pretext machine learning model 130 includes a plurality of learnable parameters θ 132. The pre-training process 110 involves the training module 50 iteratively adapting the values of the parameters 132 such that the resulting pretext machine learning model 130 achieves continuously better results on the pretext task.

The pre-training 110 starts with an initial set of parameter values for the parameters θ 132. The initial set of values for the parameters θ 132 may be selected as a common (e.g. predetermined) value for all parameters θ 132, set the initial parameter values at random such that the initial set of parameter values include a random value for each parameter of the plurality of parameters θ 132, or set in another suitable manner.

During the pre-training 110, the pretext machine learning model 130 receives from the training module 50 a pair of unannotated images including a first image $I_1$ 120 and a second image $I_2$ 122. The first and second images 120 and 122 depict at least partially the same visual content (e.g. a same scene, a same object, a same person, or a same architectural structure) but from different viewpoints or under different conditions (e.g., lighting, etc.). In this context a viewpoint from which a scene is depicted may refer to a camera position and/or a camera angle relative to the depicted scene from which the image depicting the scene has been taken. The pixel dimensions of the first and second images 120 and 122 may be equal or may differ from each other. The images 120 and 122 do not include annotations with ground-truth data according to the pretext task.

Based on the pair of the first and second images 120 and 122, the pretext machine learning model 130 generates a reconstructed image $I_R$ 140. The reconstructed image 140 may be a reconstruction of the first or the second image, or a reconstruction of an image, which can be derived from the first and/or second image by applying predetermined transformations to the first image and/or second image. These predetermined transformations may include applying one or more color transformations to one or both of the images such as a transformation to gray scale, applying one or more geometric transformations to one or both of the images, determining a combination of the first and second images such as a pixel-wise difference between the images, etc.

The pretext machine learning model 130 translates the images 120 and 122 of the image pair into representations of the images (which may be referred to as latent representations) in a mathematical representation space (a latent space). The representations may be, for example, vectors, matrices, etc.

Depending on the specific pretext task, the pretext machine learning model 130 may perform transformations on the image representations within the representation space eventually resulting in a representation of the reconstructed image 140. Finally, the representation of the reconstructed image 140 is translated back into the image space, thereby generating the reconstructed image 140. Based on the reconstructed image 140 and/or the representation of the reconstructed image 140, a pretext loss 142 is determined by the training module 50, which expresses the quality of the result achieved by the application of the pretext machine learning model 130 to the images of the image pair. The loss may be determined, for example, based on a comparison of the result (the reconstructed image 140 and/or the representation of the reconstructed image 140) with an expected result for the pair.

Generally, in machine learning, a loss may denote the value of a loss function (also called "cost function"), which is a function that maps an event or values of one or more variables onto a real number representing some "cost" associated with the event. An aim of the pre-training phase is for the training module 50 to modify the internal, learnable parameters $\theta$ 132 of the pretext machine learning model 130 so that they minimize the pretext loss 142 (i.e., the value of the loss function). The loss function may be a complicated real valued scalar function depending on each of the learnable parameters $\theta$ 132 of the pretext machine learning model 130. The optimization of the loss function (which converges towards a minimum) is performed by the training module 50 by back-propagation 144 of loss gradients, which are obtained by the training module from partial derivatives of the loss function with respect to the learnable parameters $\theta$ 132 of the pretext machine learning model 130. These loss gradients are back-propagated by the training module 50 to the respective learnable parameters $\theta$ 132 in that they are used to modify (or adapt or update) the learnable parameters $\theta$ 132 of the pretext machine learning model 130 to produce a lower loss 142 at the next iteration of the pre-training phase.

At the next iteration, the machine learning model 130 comprising the modified learnable parameters $\theta$ 132 generates another reconstructed image 140 based on the same or another image pair using the modified learnable parameters 132 as discussed above. The translation of this pair of images into representations, the transformations within the representation space, and the generation of the reconstructed image 140 is computed using the modified learnable parameters $\theta$ 132. The modified pretext machine learning model 130 is then now better suited to perform the pretext task on an image pair, leading to a lower loss 142 and to a smaller adaptation of the learnable parameters $\theta$ 132 at the next back-propagation of the loss gradients until the loss function converges towards a minimum loss 142 and until adaptation of the learnable parameters $\theta$ 132 is necessary anymore. Once the loss function has converged to the minimum, the pretext machine learning model 130 has been successfully pre-trained and the pre-training phase may be complete. In alternative embodiments, the iterative pre-training is not performed until full convergence is reached, but is terminated after a predetermined number of iterations.

The second training phase is a fine-tuning 150 of a task specific machine learning model 170 by the training module 50. The term fine-tuning in this context may refer to a training, which is performed subsequent to a pre-training phase based on results of the pre-training. In various implementations, the fine-tuning may be performed by the training module 50 supervised or partially supervised. The term supervised may refer to a training based on annotated training data. Annotated training data includes ground-truth data, which include additional information about an optimal/expected result/outcome of the specific task for which the training is performed. Ground-truth data is not used by the trained machine learning model 170, but is used by the training module 50 to determine the loss 182 for the specific training task based on a result generated by the trained machine learning model 170 given an input.

Similar to the pretext machine learning model 130, the task specific machine learning model 170 includes a plurality of learnable parameters $\theta'$ 172. The fine-tuning is performed similar to the pre-training. However, the task for which the task specific machine learning model 170 is trained by the training module 50 is a geometric vision task for which more accurate training involves the use of annotated (ground truth) data. This task may be referred to as a downstream task indicating that the ultimate goal of the training as a whole is to provide a trained machine learning model optimized for performing this task. The pretext task is a precursor task intended to enhance the training of the task specific machine learning model 170 on the downstream geometric vision task.

The fine-tuning 150 starts with an initial set of parameter values for the parameters $\theta'$ 172. The training module 50 initializes the parameters 172 to the initial set. The training module 50 initializes at least a portion of the parameters $\theta'$ 172 with the values of a corresponding portion of the parameters $\theta$ 132 of the pre-trained pretext machine learning model 130. The initial set of values for the remaining portion of the parameters $\theta'$ 172 that are not initialized with parameter values of the pre-trained pretext machine learning model 130 may be set by the training module 50, for example, to a common (e.g. predetermined) value for all the parameters of the remaining portion of the parameters $\theta'$ 172, at random such that the initial set of parameter values includes a random value for each parameter of the remaining portion of the parameters $\theta'$ 172, or in another suitable manner.

The task specific machine learning model 170 is applied to one or more annotated images from the training module 50. FIG. 1 depicts two annotated images $P_1$ 160 and $P_2$ 162 as an example. Image $P_2$ 162 is depicted in a dashed line indicating the optional nature of a second input image. Image $P_1$ 160 includes ground-truth annotations 164 and image $P_2$ 162 includes ground-truth annotations 166. In some examples, the two images $P_1$ 160 and $P_2$ 162 may be provided as an image pair, where the ground truth annotations are provided for the pair and not individually for each image. In various implementations, only part of the images are annotated and the fine-tuning is performed partially supervised and partially unsupervised. The number of input images depends on the downstream task. Applying the task specific machine learning model 170 to the one or more images results in task specific output data 180. In other words, the task specific machine learning model 170 generates task specific output data 180 based on the input image(s). Based on the task specific output data 180 and the ground-truth data of the one or more annotated input images, a task specific loss 182 is determined by the training module 50. The task specific loss 182 expresses the quality of the task specific output data 180 achieved by the application of the task specific machine learning model 170 to the images of the image pair (or the input image(s)).

As in the pre-training, the task specific loss 182 denotes the value of a loss function. An aim of the fine-tuning phase is to modify the internal, learnable parameters θ' 172 of the task specific machine learning model 170 by the training module 50 so that they minimize the task specific loss 182 (the value of the loss function). The loss function may be a complicated real value scalar function depending on each of the learnable parameters θ' 172 of the task specific machine learning model 170. The optimization of the loss function (which converges towards a minimum) is performed by back-propagation 184 of the loss gradients, which are obtained by the training module 50 from the partial derivatives of the loss function with respect to the learnable parameters θ' 172 of the task specific machine learning model 170. These loss gradients are back-propagated to the respective learnable parameters θ' 172 by the training module 50 in that they are used to modify (or adapt or update) the learnable parameters θ' 172 of the task specific machine learning model 170 to produce a lower loss 182 at the next iteration of the fine-tuning phase.

At the next iteration, the task specific machine learning model 170 including the modified learnable parameters θ' 172 is applied to the same or other annotated images to generate other task specific output data 180. In other words, the task specific machine learning model 170 generates new task specific output data 180 based on the input images. The modified task specific machine learning model 170 is now better suited to perform the downstream task on the one or more images, leading to a lower loss 182 and to a smaller adaptation of the learnable parameters θ' 172 at the next back-propagation of the loss gradients, until the loss function converges towards a minimum loss 182 and no adaptation of the learnable parameters θ' 172 is necessary anymore. Once the loss function has converged, the task specific machine learning model 170 has been successfully fine-tuned. In various implementations, the iterative fine-tuning is not performed until full convergence is reached, but is terminated by the training module 50 after a predetermined number of iterations.

Figure 2:
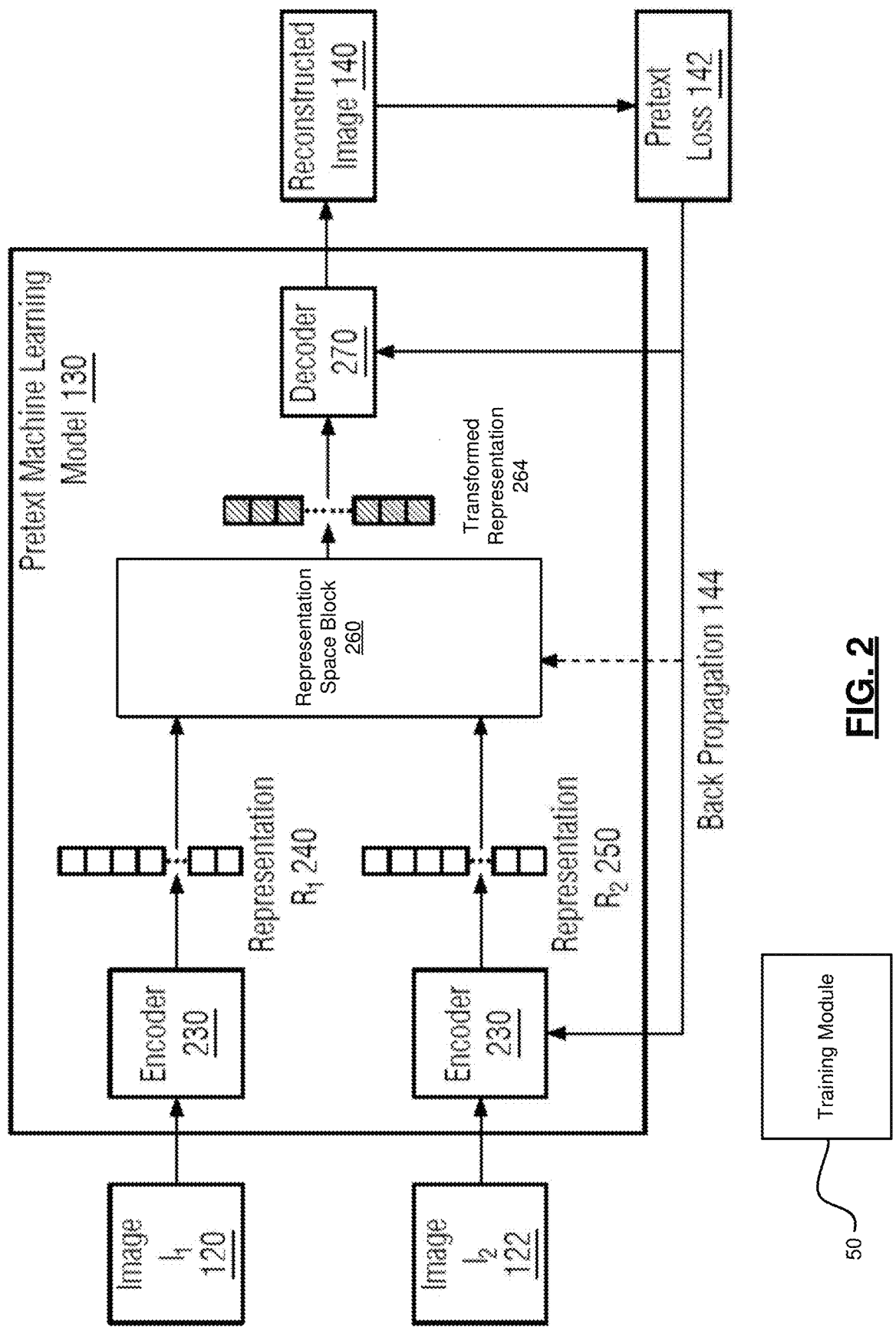
FIG. 2 illustrates a functional block diagram for an example procedure for unsupervised pre-training of a machine learning model on a pretext task using a pair of unannotated images.

FIG. 2 illustrates an example of the pre-training phase 110 of the training of FIG. 1. The pretext machine learning model 130 includes an encoder (module) 230, a representation space block (module) 260, and a decoder (module) 270. The encoder 230 includes a set of learnable encoder parameters and the decoder 270 includes a set of learnable decoder parameters. Depending on the specific pretext task, the representation space block 260 may also include a set of learnable parameters. Learnable and trainable may be used interchangeably.

The pretext machine learning model 130 is applied to a pair of unannotated images including a first image $I_1$ 120 and a second image $I_2$ 122. The first image 120 depicts visual content from a first viewpoint. The second image 122 depicts at least partially the same visual content (e.g. a same scene, a same object, a same person, or a same architectural structure), but differs from the first image either in the viewpoint from which the same visual content is depicted or in other conditions under which the images have been produced, such as lighting conditions, seasonal differences, the depth of field, focal length, etc. The pixel dimensions of the first and second images 120 and 122 may be equal or may differ from each other. The images 120 and 122 do not need to include annotations with ground-truth data according to the pretext task since the pre-training method is performed unsupervised. In some embodiments the pre-training is performed self-supervised. Self-supervised pre-training may refer to a particular example of unsupervised pre-training, where the loss is determined by the training module 50 based on the unannotated input data (e.g. input images) such that no ground-truth annotations are needed to perform the pre-training.

The encoder 230 of the pretext machine learning model 130 is applied to the first image $I_1$ 120 to encode the image into a first representation $R_1$ 240. The encoder 230 of the pretext machine learning model 130 is additionally applied to the second image $I_2$ 122 to independently encode the second image 122 into a second representation $R_2$ 250. A representation of an image is an element in a mathematical space (e.g. a vector space). A representation may be a vector, a set of vectors, a matrix, or a tensor.

The representation space block 260 receives the two image representations $R_1$ 240 and $R_2$ 250, and transforms one of the representations (e.g., the representation $R_1$ 240 of the first image $I_1$ 120) into a transformed representation 264. In one example, the first representation $R_1$ 240 is transformed according to the second representation $R_2$ 250 such that the transformed representation 264 aligns with the second representation $R_2$ 250. In another example, the first representation is transformed by adding learnable elements to the first representation. The transformation of one representation may depend on the other representation or may be independent of the other representation.

The decoder 270 decodes the transformed representation 264 into a reconstructed image 140. The reconstructed image 140 may be a reconstruction of the first or the second image, or a reconstruction of an image derivable from the first and/or second image. Optionally, the decoder 270 receives the image representation, which has not been transformed into the transformed representation 264 as additional input for decoding the transformed representation 264 into the reconstructed image 140. In an example, where the first image representation $R_1$ 240 has been transformed into the transformed representation 264, the decoder 270 may receive the second representation $R_2$ 250 as additional input to decode the transformed representation 264 into the reconstructed image 140. In any case, the reconstructed image 140 is generated based on both image representations $R_1$ 240 and $R_2$ 250 in that the transformation of the first representation $R_1$ 240 depends on the second representation $R_2$ 250 and/or the decoding of the transformed representation 264 (when resulting from a transformation of the first representation $R_1$ 240) is based on the second representation $R_2$ 250.

Later, a pretext loss 142 is determined by the training module 50 based on the reconstructed image 140, and back-propagation 144 is performed by the training module to modify the learnable parameters of the pretext machine learning model 130 based on minimizing the pretext loss. This includes, in particular, the training module 50 modifying the learnable parameters of the decoder 230 and the encoder 270. In cases where the representation space block 260 includes learnable parameters, these parameters may also updated by the training module during the back propagation 144. The determination of the pretext loss 142 may be based on the reconstructed image 140 and, in particular, may be based on a metric, which quantifies a deviation of the reconstructed image 140 from the image it is supposed to reconstruct. In an example, the reconstructed image 140 may be a reconstruction of the first image $I_1$ 120; in this example, the pretext loss 142 may be determined by the training module 50 based on a metric quantifying the deviation of the reconstructed image 140 from the first image $I_1$ 120. In another example, the reconstructed image 140 may be a reconstruction of the second image $I_2$ 122, and the pretext loss 142 may be determined by the training module 50 based on a metric quantifying the deviation of the reconstructed image 140 from the second image $I_2$ 122. Additionally or alternatively, the pretext loss 142 may be determined by the training module 50 based on a metric quantifying the difference between the transformed representation 264 and the image representations $R_1$ 240 or $R_2$ 250, which has not been transformed into the transformed representation 264.

In the following, two specific pretext tasks for unsupervised pre-training 110 of pretext machine learning model 130 will be presented with reference to FIG. 3 and FIG. 4.

Figure 3:
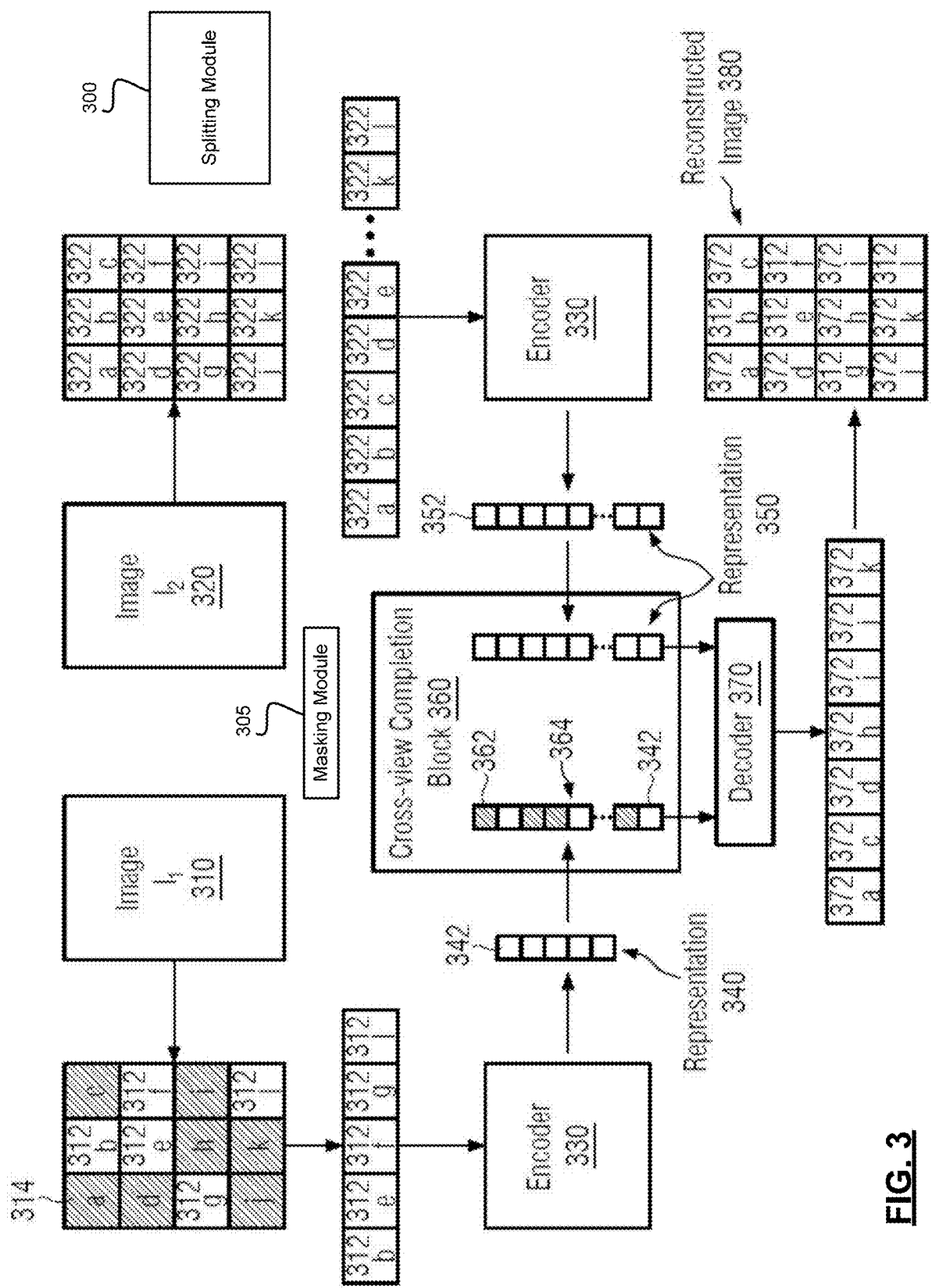
FIG. 3 illustrates a functional block diagram for an example procedure for self-supervised cross-view completion pre-training of a pretext machine learning model using a pair of unannotated images.

FIG. 3 illustrates an example pre-training system for the pretext task of cross-view completion. The term cross-view completion pre-training may refer to the pre-training of a pretext machine learning model for the cross-view completion pretext task. Herein, the abbreviation CroCo will be used to refer to cross-view completion.

Figure 4:
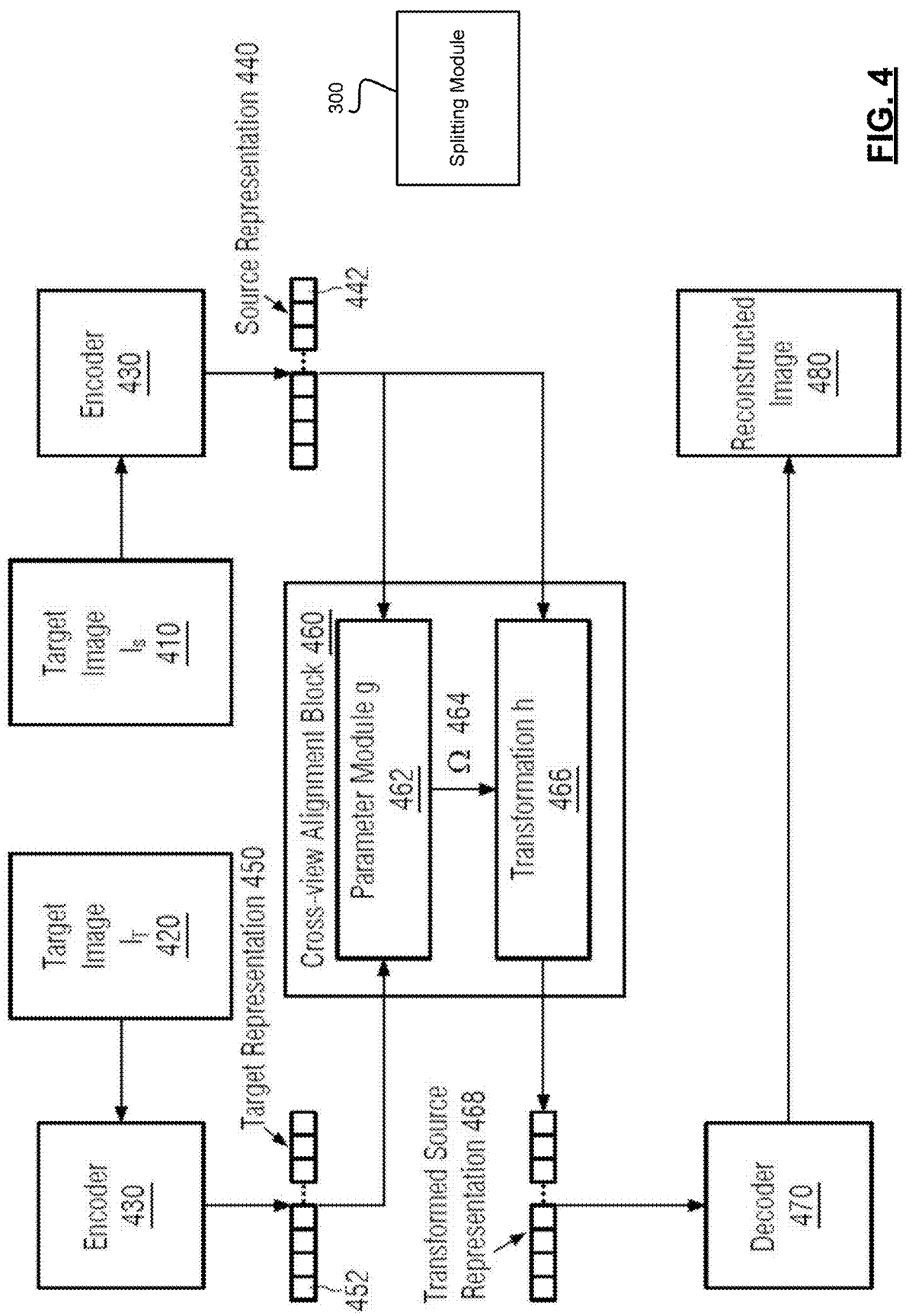
FIG. 4 illustrates a functional block diagram for an example procedure for self-supervised cross-view alignment pre-training of a pretext machine learning model using a pair of unannotated images.

FIG. 4 illustrates an example unsupervised pre-training system for the pretext task of cross-view alignment. The term cross-view alignment pre-training may refer to the pre-training of a pretext machine learning model for the cross-view alignment pretext task. Herein, the abbreviation Caiman will be used to refer to cross-view alignment.

The cross-view completion pre-training system as illustrated in FIG. 3 is an example implementation of unsupervised pre-training 110. The pretext machine learning model for CroCo pre-training will be subsequently referred to as a CroCo machine learning model. The CroCo machine learning model corresponds to pretext machine learning model 130 as illustrated in FIG. 2. The CroCo machine learning model includes an encoder (module) 330 (corresponding to encoder 230), a decoder (module) 370 (corresponding to decoder 270), and a cross-view completion block (module) 360 (corresponding to representation space block 260).

The CroCo machine learning model is applied to a pair of unannotated images including a first image $I_1$ 310 and a second image $I_2$ 320. The two images depict the same visual content (e.g., a same scene, a same object, a same person, or a same architectural structure) from different viewpoints or under different conditions (e.g., lighting conditions, seasonal conditions, depth of field, focal length, etc.). The pixel dimensions of the two images may be equal or may differ from each other. The images 310 and 320 do not need to include annotations with ground-truth data according to the CroCo task since the CroCo pre-training method is performed unsupervised.

A splitting module 300 splits the first image $I_1$ 310 into a set $p_1$ of $N_1$ non-overlapping image patches $p_1^i$ 312, $p_1 = \{p_1^1, \ldots, p_1^{N_1}\}$. The different patches $p_1^i$ 312 may have a same pixel size or may differ in pixel size. The patches 312 may have predetermined pixel sizes such as 4×4, 8×8, 12×12, 16×16, or 32×32 pixels. However, the patches 312 may have any other suitable pixel size and may not be quadratic, but rectangular (e.g. 4×8 or 16×32 pixels). For simplicity, FIG. 3 shows a relatively small number of 12 patches 312 for image $I_1$ 310 labeled a to l. However, the image $I_1$ 310 can be split in any number of patches, such as based on the image pixel size and the patch pixel size.

In the same way as the first image $I_1$ 310, the splitting module 400 splits the second image $I_2$ 320 into a set $p_2$ of $N_2$ non-overlapping patches $p_2^i$ 322, $p_2 = \{p_2^1, \ldots, p_2^{N_2}\}$. The pixel sizes of patches 312 of the first image $I_1$ 310 and of patches 322 of the second image $I_2$ 320 may be equal or may differ from each other. In one example, both the first image $I_1$ 310 and the second image $I_2$ 320 are split into non-overlapping patches 312 and 322 with a size of 16×16 pixels. The number of patches in the set $p_1$ may be equal to or higher or lower than the number of patches in the set $p_2$.

A portion of the patches 312 of the set $p_1$ is masked by a masking module 305 separating the set $p_1$ in a set $\bar{p}_1 = \{p_1^i | m_i = 1\}$ of masked patches 314 (i.e. patches a, c, d, h, i, j, and k identified with etching) and a set $\tilde{p}_1 = \{p_1^i | m_i = 0\}$ of remaining unmasked patches, where $m_i = 0$ denotes that the patch $p_1^i$ is unmasked and $m_i = 1$ denotes that the patch $p_1^i$ is masked. Masking a patch in this context may refer to marking or otherwise identifying the patch as being a masked patch 314. In various implementations, the pixel content of a masked patch 314 may not altered or deleted such that the pixel content of the masked patch 314 can still be used to determine a CroCo loss (corresponding to the pretext loss 142). Which ones of the patches to mask may be selected by the masking module 305 such as randomly from the set of patches 312 of image $I_1$ 310 according to a predetermined ratio of masked patches to the total number of patches $N_1$. Alternatively, the masked patches 314 may be chosen by the masking module 304 based on a predetermined pattern or another predetermined selection rule. In an example, the ratio of masked patches to the total number of patches for image $I_1$ 310 is higher than 0.5. For example only, the ratio may be between 0.75 or 0.95. In FIG. 3 the first image $I_1$ 310 is split into 12 patches, which are similarly labeled as patches 322 of image $I_2$ 320. Only the five patches 312 with the labels b, e, f, g and l are unmasked, the remaining seven patches labeled a, c, d, h, i, j and k are masked patches 314. The present application is also applicable to other numbers of patches after the splitting and to other numbers of unmasked and masked patches.

The encoder $\varepsilon_\theta$ 330 includes a set of learnable parameters $\theta$. The encoder 330 is applied to the second image $I_2$ 320 by applying the encoder 330 to the set of patches $p_2$, thereby encoding the set of patches $p_2$ into a representation $\varepsilon_\theta(p_2)$ 350 of the image $I_2$ 320. The set of patches $p_2$ are encoded in a set of patch representations 252 forming the representation $\varepsilon_\theta(p_2)$ 350 of the image $I_2$ 320. The encoder 330 may encode each patch 322 of the set of patches $p_2$ individually into a corresponding patch representation 252 such that the encoder 330 creates one patch representation 252 (e.g., a feature vector) per patch 322 of the set of patches $p_2$.

The same encoder $\varepsilon_\theta$ 330 is also applied to image $I_1$ 310 to independently encode the first image $I_1$ 310 in a representation 340 of image $I_1$ 310. However, in this case, the encoder 330 is only receives the set of remaining unmasked patches $\tilde{p}_1$, thereby encoding the set of unmasked patches $\tilde{p}_1$ into the representation $\varepsilon_\theta(\tilde{p}_1)$ 340 of the image $I_2$ 310. The set of patches $\tilde{p}_1$ are encoded in a set of patch representations 342 forming the representation $\varepsilon_\theta(\tilde{p}_1)$ 340 of the image $I_1$ 310. The encoder 330 may encode each patch of the set of patches $\tilde{p}_1$ individually into a corresponding patch representation 342 such that the encoder 330 creates one patch representation 242 (e.g., a feature vector) per patch of the set of unmasked patches $\tilde{p}_1$.

In an example, the encoder 330 may be implemented with the Vision Transformer (ViT) architecture, such as described in Dosovitskiy et al., An Image is Worth 16×16 Words: Transformers for Image Recognition at Scale, ICLR, 2021, which is incorporated herein in its entirety. The image patches may be used as tokens for the ViT backbone. In accordance with the ViT approach, the encoder 330 may include a linear projection on the input tokens (the patches 322 of the set $p_2$ or the unmasked patches 312 of the set $\tilde{p}_1$) to which sinusoidal positional embeddings may be added, followed by a series of transformer blocks (e.g. self-attention followed by a Multi-Layer Perceptron (MLP)). Sinusoidal positional embeddings are described in Vaswani et al., Attention is all you need, NeurIPS, 2017, which is incorporated herein in its entirety.

The cross-view completion block 360 receives representation $\varepsilon_\theta(\tilde{p}_1)$ 340 and optionally representation $\varepsilon_\theta(p_2)$ 350. The CroCo completion block 360 leaves representation $\varepsilon_\theta(p_2)$ 350 unaltered and forwards the representation to the decoder 370. Additionally, the CroCo block 360 transforms representation $\varepsilon_\theta(\tilde{p}_1)$ 340 into transformed representation $\varepsilon_\theta(\tilde{p}_1)'$ 364, such as by padding representation $\varepsilon_\theta(\tilde{p}_1)$ 340 with learned patch representations 362 (e.g., learned feature vectors) corresponding to the masked patches of image $I_1$ 310. In an example, representation $\varepsilon_\theta(\tilde{p}_1)$ 340 is padded with one learned representation 362 (e.g., a learned feature vector) for each masked patch of image $I_1$ 310. As the dimension of the patch representations used as input by the decoder 370 may differ from the dimension of the patch representations generated by the encoder 330, the CroCo block 360 may perform a further transformation on $\varepsilon_\theta(p_2)$ and $\varepsilon_\theta(\tilde{p}_1)'$, such as by applying a fully-connected layer to the patch representations to project them to a predetermined input dimension for the decoder 370.

Cross-view completion block 360 provides the transformed representation $\varepsilon_\theta(\tilde{p}_1)'$ 364 to the decoder 370. Additionally, the decoder 370 receives representation $\varepsilon_\theta(p_2)$ 350 either directly from the encoder 330 or via the cross-view completion block 360. In the following, the decoder 370 is denoted $D_\phi$, which indicates that decoder $D_\phi$ 370 includes a set of learnable parameters $\phi$. The decoder 370 decodes transformed representation $\varepsilon_\theta(\tilde{p}_1)'$ 364 conditioned on $\varepsilon_\theta(p_2)$ 350 into a reconstruction $\hat{p}_1$ of the set of patches $p_1$, thereby generating a reconstructed image 380 as a patch-wise reconstruction of image $I_1$ 310, which may be expressed as:

$$\hat{p}_1 = D_\phi(\varepsilon_\theta(\tilde{p}_1)'; \varepsilon_\theta(p_2)) \quad (1)$$

In an example, the transformed representation $\varepsilon_\theta(\tilde{p}_1)'$ 364 is fed to a series of decoder transformer blocks (transformer modules (modules having the transformer architecture) of the decoder). Each block may include: (a) self-attention on the patch representations of $\varepsilon_\theta(\tilde{p}_1)'$ 364 including the patch representations 342 of image representation $\varepsilon_\theta(\tilde{p}_1)$ 340 and the added learned patch representations 362 corresponding to the masked patches 314 of $\bar{p}_1$; (b) cross-attention with the patch representations of $\varepsilon_\theta(p_2)$ 340; and (c) a Multi-Layer Perceptron (MLP).

The set of learnable encoder parameters $\theta$, the set of learnable decoder parameters $\phi$, and the parameters of the learned patch representations of transformed representation $\varepsilon_\theta(\tilde{p}_1)'$ are updated by the training module 50 via backpropagation 144 based on the pretext loss 142, as described with reference to FIG. 2.

In an example, the respective pretext loss may be determined by the training module 50 based on a patch-wise comparison of $\hat{p}_1$ and $p_1$ for the unmasked patches based on a metric that quantifies the difference of a patch $\hat{p}_1^i$ of $\hat{p}_1$ and the corresponding masked patch $p_1^i$ of $\bar{p}_1$. In an example, the pretext loss for images $I_1$ and $I_2$ is evaluated as a Mean Square Error (MSE) loss between the pixels of a reconstructed patch $\hat{p}_1^i$ of $\hat{p}_1$ and the corresponding pixels of the corresponding masked patch $p_1^i$ of $\bar{p}_1$ averaged over all unmasked patches of $\bar{p}_1$, such as described by the equation $$\mathcal{L}(I_1, I_2) = \frac{1}{|\bar{p}_1|} \sum_{p^i \in \bar{p}_1} \|\hat{p}_1^i - p_1^i\|^2 \quad (2)$$

Alternatively, the pretext loss may be determined by the training module 50 by normalizing the reconstructed patches $\hat{p}_1^i$ of $\hat{p}_1$ and the corresponding masked patches $p_1^i$ of $\bar{p}_1$ within each patch, such as according to the mean and standard deviation of all pixels in a given patch. Based on the normalization values for each patch, the Mean Square Error (MSE) loss between the reconstructed patches $\hat{p}_1^i$ of $\hat{p}_1$ and their respective corresponding unmasked patches $p_1^i$ of $\bar{p}_1$ are determined and averaged by the training module 50 over all unmasked patches of $\bar{p}_1$.

The pre-trained CroCo machine learning model can subsequently be used for supervised fine-tuning a task specific machine learning model for a downstream geometric vision task as detailed in the fine-tuning process 150 of FIG. 1. Fine-tuning for monocular tasks, which create predictions for a single image (e.g., monocular depth estimation, where a depth-map is predicted for a single image) may be distinguished from fine-tuning for tasks that need more than one image as input (e.g., two images). In the monocular fine-tuning scenario, the input image may be split into non-overlapping patches (e.g. 4×4, 8×8, 16×16 or 32×32 pixel patches) by the splitting module 300 and input to a ViT encoder, which is initialized by the training module 50 from the parameters of the pre-trained encoder 330 learned with self-supervision. Subsequently, the ViT encoder is fine-tuned by the training module 50 on the downstream task. For dense prediction tasks, the task specific machine learning model may be provided with a final fully-connected layer as prediction head that processes each patch representation produced by the ViT encoder independently and outputs the required predictions per pixel in each patch representation. This final output layer is trained by the training module 50 from scratch, unlike the ViT encoder.

CroCo pre-training can also be used for downstream tasks that involve a pair of images as input (e.g., optical flow). In this case, each input image is split by the splitting module 300 into non-overlapping patches (e.g. 4×4, 8×8, 16×16 or 32×32 pixel patches). The task specific machine learning model includes a task specific encoder with the same structure as the encoder 330. The task specific encoder is initialized by the training module 50 with the parameter values of the pre-trained encoder 330. The encoder 330 of the task specific machine learning model encodes the patches of each image of the image pair in a respective representation, each including a set of patch representations.

The task specific machine learning model further includes a task specific decoder, which has the same structure as the decoder 370. The task specific decoder is initialized by the training module 50 with the parameter values of the pre-trained decoder 370. The patch representations of the representation of the first image are processed by the decoder 370 using cross-attention computed with respect to the patch representations of the representation of the second image.

A final layer may be included as prediction head to project the outputs of the decoder 370 to a predetermined dimension and shape.

For the training, the CroCo machine learning model may be pre-trained for 200 or another suitable number of epochs, such as using the AdamW optimizer. A cosine learning rate schedule with a base learning rate of $1.5 \times 10^{-4}$ may be used for an effective batch size of 256. Additionally, a linear warmup in the first 40 epochs may be performed. A ViT-Base backbone may be used as encoder including a series of 12 transformer blocks (modules) with 768 dimensions and 12 heads for self-attention, with patches of size 16×16 pixels. For the decoder, a series of 8 decoder blocks (modules) with 512 dimensions and 16 heads for both self- and cross-attention may be used.

The CroCo machine learning model may be pre-trained on a dataset including image pairs of indoor scenes. The pre-trained encoder may be kept as the initial encoder of a task specific machine learning model as part of which the pre-trained encoder is then fine-tuned to perform monocular depth estimation. For the downstream task optical flow estimation, both the pre-trained encoder and the pre-trained decoder may be kept as the initial encoder and decoder of a task specific machine learning model for optical flow estimation. Both the encoder and the decoder are later fine-tuned by the training module 50 to perform optical flow estimation given pairs of images.

The performance of the pre-trained CroCo model may be evaluated when fine-tuned for the task of monocular depth estimation. In this example, the task specific machine learning model generates 256 values (depth predictions) per patch. The final outputs are exponentiated by the model to enforce that depth predictions are positive. Subsequently, the training module 50 selectively trains the model based on minimizing an MSE (mean squared error) loss between predictions and ground-truth depth values. Additionally, the pre-trained CroCo model may be evaluated by fine-tuning it for optical flow estimation, by predicting two values per pixel in each patch using the prediction head. An MSE loss may be minimized by the training module 50 for fine-tuning. The experimental results show that the CroCo pretext task allows to pre-train task specific models for downstream geometric vision tasks more effectively than other methods by taking advantage of lower-level geometric cues.

TABLE 1

Ablation of the masking ratio (i.e., the ratio of the number of masked patches for image $I_1$ to the total number of patches for image $I_1$).

| Masking ratio r | Depth Acc @1.25 (%) ↑ | Flow MSE ($\cdot 10^{-4}$) ↓ |
| --- | --- | --- |
| 75% | 80.29 | 7.3390 |
| 80% | 81.44 | 7.1615 |
| 85% | 82.03 | 7.0951 |
| 90% | 83.51 | 6.8745 |
| 95% | 83.14 | 6.6488 |

The experiments may be performed on synthetic images of 3D indoor scenes. In each 3D scene, up to 1000 pairs of camera viewpoints with a co-visibility greater than 50% may be randomly sampled. These pairs of viewpoints may be rendered using a Habitat simulator. In an example, a total of 1,821,391 pairs for pre-training may be generated from different indoor scenes.

Additionally, in an example a training (and respectively test) set for downstream tasks of 200,000 (resp. 20,000 pairs) may be created for other indoor scenes. For monocular depth estimation, the downstream task specific model may be fine-tuned on 20,000 images, while 2,000 images may be used for fine-tuning for optical flow estimation. Images of size 256×256 pixels may be generated and crops of size 224×224 may be used. For monocular depth estimation, Acc@1.25 is reported, which may involve the ratio of pixels fulfilling the condition $\max(d/\bar{d},\bar{d}/d)<1.25$, with d and $\bar{d}$ the predicted and ground-truth depth respectively. For optical flow estimation, the Mean Square Error (MSE) loss is reported.

In Table 1 above, the impact of the masking ratio r is illustrated. Note that 75% masking may provide accuracy in the context of auto-completion for MAE. Overall, high masking ratios of 90% or 95% better performance of the CroCo model.

In Table 2 below, additionally the performance of the CroCo approach is evaluated when normalizing the targets and when varying the decoder depth, i.e., the number of decoder blocks in $D_\phi$. Normalizing the targets may improve performance for both downstream tasks. While the decoder depth may have only minimal impact for the monocular task, a sufficiently deep decoder may be used for tasks that take pairs of images as input, such as optical flow, as it also increases the model capacity.

TABLE 2

Impact of normalizing targets and decoder depth with 90% masking ratio.

| norm. target | decoder depth | Depth Acc @1.25 (%) ↑ | Flow MSE ($\cdot 10^{-4}$) ↓ |
| --- | --- | --- | --- |
| X | 8 | 83.51 | 6.8745 |
| ✓ | 8 | 84.67 | 6.2924 |
| ✓ | 6 | 83.70 | 7.1711 |
| ✓ | 4 | 83.33 | 10.337 |
| ✓ | 2 | 85.08 | 13.219 |

The CroCo pre-training method evaluated on downstream tasks is compared to training from scratch as well as another model (MAE) in Table 3 below. The other model may be pre-trained and additionally fine-tuned with supervision for image classification on this dataset, or pre-trained on a dataset such as the same images that are used for pre-training according to the CroCo approach. A benefit of pre-training for both tasks has been observed compared to training from scratch with, for instance, a difference of about 20% for depth accuracy at the 1.25 threshold. CroCo pre-training may provide superior performance than the other model for geometric tasks, with a gain of about 1% for depth accuracy at 1.25. Also, results are obtained that are two orders of magnitude better for optical flow estimation.

TABLE 3

Comparison to other (MAE) with ViT-B encoder.

| | Depth Acc @1.25 (%) ↑ | Flow MSE ($\cdot 10^{-4}$) ↓ |
| --- | --- | --- |
| from scratch | 62.66 | 275 |
| MAE pretrained | 77.19 | 152 |
| MAE pretrained & finetuned | 81.63 | 259 |
| MAE pretrained | 83.84 | 277 |
| CroCo pretrained | 84.67 | 6.30 |

The cross-view alignment (Caiman) pre-training system as illustrated in FIG. 4 is another example implementation of unsupervised pre-training 110. The pretext machine learning model for Caiman pre-training may be referred to as the Caiman machine learning model. The Caiman machine learning model corresponds to pretext machine learning model 130, as illustrated in FIG. 2. The Caiman machine learning model includes an encoder (module) 430 (corresponding to encoder 230), a decoder (module) 470 (corresponding to decoder 270) and a cross-view alignment block (module) 460 (corresponding to representation space block 260). The encoder 430 includes a set of learnable encoder parameters θ, and the decoder 470 includes a set of learnable decoder parameters φ.

The Caiman machine learning model is applied to a pair of unannotated images including a source image $I_S$ 410 and a target image $I_T$ 420. The two images depict the same visual content (e.g., a same scene, a same object, a same person, or a same architectural structure) from different viewpoints or under different conditions (e.g., lighting conditions, seasonal conditions, depth of field, focal length, etc.). The pixel dimensions of the two images may be equal or may differ from each other. The images 410 and 420 do not need to include additional annotations with ground-truth data according to the Caiman task since the Caiman pre-training is performed unsupervised.

The source image $I_S$ 410 is encoded into source representation $x_S$ 440 by the encoder 430. The encoder 430 independently encodes target image $I_T$ 420 into target representation $x_T$ 450. In an embodiment, source representation $x_S$ 440 may be an ordered set of n K-dimensional vectors 442, $x_S = \{x_{S,i}\}_{i=1,\ldots,n}$, where $x_{S,i} \in \mathbb{R}^K$. Similarly, target representation $x_T$ 450 may be an ordered set of n K-dimensional vectors 452, $x_T = \{x_{T,i}\}_{i=1,\ldots,n}$, where $x_{T,i} \in \mathbb{R}^K$. The number of vectors n and their dimension K are adjustable parameters of the Caiman pre-training method and can be set to any suitable value. In an example embodiment, n=512 and K=128.

In an example implementation of the encoder 430, the source and target representations may be generated using an architecture based on Perceiver IO, described in Jaegle et al., Perceiver IO: A General Architecture for Structured Inputs & Outputs", ICLR, 2022, which is incorporated herein its entirety. For example, a two dimensional (2D) convolution layer (e.g., a 5×5, 6×6, 7×7, or 9×9 2D convolution layer) and a Rectifier Linear Unit (ReLU) activation may be applied to an input image (e.g. source image $I_S$ 410 or target image $I_T$ 420) to produce a feature map, where the feature map may include one feature vector for each pixel of the input image. The dimension of the feature vector may be a predetermined parameter of the encoder and may be a suitable number. In some examples, the dimension of the feature vector is 32, 64, 128, or 256. The feature map may be split into patches of feature vectors (e.g., into non-overlapping quadratic patches of sizes 8×8, 12×12, 16×16, 20×20 or 32×32) by the splitting module 300. Each patch may be associated with a Fourier positional encoding. The patches are subsequently used to modify a set of n randomly initialized vectors of dimension K through cross-attention to produce a representation x of the input image (e.g. source image $I_S$ 410 or target image $I_T$ 420), updated by applying a block of self-attention layers (e.g. 4, 6, 8, 10 or 12 self-attention layers).

The source representation $x_S$ 440 and the target representation $x_T$ 450 are provided to the cross-view alignment block 460. Cross-view alignment block 460 transforms source representation $x_S$ 440 into transformed source representation $\hat{x}_S$ 468 by applying transformation h 466 to source representation $x_S$ 440. Transformation h 466 includes a set of transformation parameters Ω 464, which are configured to transform source representation $x_S$ 440 such that the resulting transformed source representation $\hat{x}_S$ 468 approximates (e.g., aligns with) target representation $x_T$ 450. In order to achieve alignment between transformed source representation $\hat{x}_S$ 468 and target representation $x_T$ 450, parameter module g 462 determines the parameters Ω 464 of the transformation h based on the source representation $x_S$ 440 and the target representation $x_T$ 450, or in mathematical terms, $\Omega = g(x_S, x_T)$. The determined parameters Ω 464 are input to the transformation h 466 to transforms source representation 442 into transformed source representation 468.

In an example of the cross-view alignment block 460, it is assumed that each vector $x_i \in \mathbb{R}^K$ can be decomposed into two parts, an equivariant part $x_i^{equiv} \in \mathbb{R}^D$ and an invariant part $x_i^{inv} \in \mathbb{R}^{K-D}$, where 0<D≤K. The invariant part may be constant across different views of the same scene, contrary to the equivariant part, which may change across the source and target views. One possible example for transformation $h_\Omega$ 466 is a D-dimensional rotation. However, the present application is also applicable to other transformations, and a more complex transformation may be chosen instead (e.g., more general D-dimensional affine or geometric transformations). With the above, transformation $h_\Omega$ 466 is given as a D-dimensional rotation matrix Ω and applying transformation $h_\Omega$ 466 to source representation $x_S$ 440 amounts to multiplying the equivariant part of each representation vector $x_{S,i}^{equiv}$ with rotation matrix Ω. Given the representations $x_S$ and $x_T$ of the source and target images $I_S$ and $I_T$, the rotation matrix Ω that best aligns the equivariant parts of the source and target representations may be estimated as:

$$\Omega = \arg\min_{\hat{\Omega} \in SO(D)} \sum_{i=1}^{n} \|\hat{\Omega} x_{S,i}^{equiv} - x_{T,i}^{equiv}\|^2 \qquad (3)$$

SO(D) denotes the D-dimensional special orthogonal group, which includes all possible D-dimensional rotation matrices. The rotation may be estimated using a closed and differentiable form, such as described in Schönemann, A generalized solution of the orthogonal Procrustes problem, Psychometrika, 1966, or Umeyama, Least-squares estimation of transformation parameters between two point patterns, TPAMI, 1991, or Brégier, Deep regression on manifolds: a 3D rotation case study, 3DV, 2021, which are incorporated herein in their entirety. This allows to align source representation $x_S$ 440 to target representation $x_T$ 450. Specifically, the transformed source representation $\hat{x}_S$ 468 can be determined by the cross-view alignment block 460 as follows: $\hat{x}_S \triangleq (\Omega x_S^{equiv}, x_S^{inv})$.

To solve the cross-view alignment task, the Caiman machine learning model extracts some transformation parameters representing how the source and target images are related (the rotation matrix Ω). This enables the model to encode changes of viewpoints, lighting, etc. between views. In some embodiments, the transformation h is constrained to have a predetermined number of degrees of freedom. This predetermined number is an adaptable parameter of the Caiman pre-training procedure and can be set to any suitable number. In the above exemplary implementation, this constrained number of degrees of freedom amounts to constraining D to a predetermined number (e.g. 24).

Once the source representation $x_S$ 440 has been transformed into transformed source representation $\hat{x}_S$ 468, decoder 470 decodes transformed source representation $\hat{x}_S$ 468 into reconstructed image $I_R$ 480. In an example implementation of the decoder, transformed source representation $\hat{x}_S$ 468 is decoded into a feature map using a patch-based approach. The feature map may include one feature vector of a predetermined dimension (e.g. 32, 64, 128, or 256) for each pixel of the reconstructed image. For each patch of a predetermined patch size (e.g. 8×8, 12×12, 16×16, 32×32 pixels) of the feature map, a flattened representation of the features map values for this patch are generated (e.g., by a flattening module), such as by performing a cross-attention between $\hat{x}_S$ and a Fourier encoding of the patch 2D position. The flattened representations are merged (e.g., by a merging module) into a single feature map, and a 2D convolution layer with a predetermined convolution kernel size (e.g. 5×5, 7×7, 9×9) is applied to produce the final reconstructed RGB image. The reconstructed image may have the same pixel dimensions as the target image $I_T$ 420.

The set of learnable encoder parameters θ and the set of learnable decoder parameters ϕ are updated by the training module 50 by back-propagation (e.g., back-propagation 144) based on a pretext loss (e.g. pretext loss 142). The loss for Caiman pre-training (the Caiman loss) may be determined by the training module 50 based on a comparison of the reconstructed image $I_R$ 480 to the target image $I_T$ 420, e.g. based on a metric (e.g., the Mean Square Error metric) quantifying the deviation of the reconstructed image $I_R$ 480 from the target image $I_T$ 420. Additionally, or alternatively, the Caiman loss may be determined by the training module 50 based on a comparison of the transformed source representation $\hat{x}_S$ 468 to the target representation $x_T$ 450, e.g. based on a metric (e.g. the Mean Square Error metric) quantifying the deviation of the, transformed source representation $\hat{x}_S$ 468 from the target representation $x_T$ 450. In one embodiment, the Caiman loss may be determined by the training module 50 using the equation:

$$\mathcal{L}(I_S, I_T) = \sum_{i=1}^{H \times W} \mathcal{L}_\delta(\|I_R(i) - I_T(i)\|_2) + \lambda \|\hat{x}_S - x_T\|_2, \quad (4)$$

where $I_R(i)$ correspond to the red green blue (RGB) values of the reconstructed image $I_R$ 480 at the pixel position i and equivalently, $I_T(i)$ correspond to the RGB values of the target image $I_T$ 420 at the pixel position i. $\mathcal{L}_\delta$ is the Huber loss:

$$\mathcal{L}_\delta(a) = \begin{cases} \frac{1}{2}a^2 & \text{for } |a| \leq \delta \\ \delta \cdot \left(|a| - \frac{\delta}{2}\right) & \text{otherwise} \end{cases} \quad (5)$$

In an example δ=0.1. However, another suitable value for δ=0.1 may be used.

The pre-trained Caiman machine learning model (specifically pre-trained encoder 430 and pre-trained decoder 470) can be used for supervised fine-tuning of a task specific machine learning model for a downstream geometric vision task, as detailed in the fine-tuning process 150 of FIG. 1. One may distinguish between fine-tuning for monocular tasks, which create predictions for a single image (e.g., monocular depth estimation, where a depth-map is predicted for a single image) and fine-tuning for tasks that use multiple images as input (e.g., two images). In the monocular fine-tuning scenario, the task specific machine learning model may include an encoder and a decoder, both having the same structure as their counterparts in the Caiman machine learning model. The encoder parameters of the encoder of the task specific machine learning model are initialized with the parameters of the pre-trained encoder of the Caiman machine learning model. Similarly, the decoder parameters of the decoder of the task specific machine learning model are initialized with the parameters of the pre-trained decoder of the Caiman machine learning model. The task specific model for monocular downstream geometric vision tasks (e.g. monocular depth estimation) may include a final convolutional layer outputting a single channel (e.g., the depth). This final layer may be trained by the training module 50 from scratch, while the encoder and the decoder are initialized by the training module 50 with the pre-trained (predetermined) parameters. The encoder is applied to the input image to generate a representation of the input image. The decoder, together with the final layer, generates the output data (e.g., the depth data).

CroCo pre-training can also be used for downstream tasks that require a pair of images as input (e.g., relative pose estimation). In the example of relative camera pose estimation, the downstream geometric vision task includes estimating the relative camera displacement between two views of the same scene. Cross-view alignment provides a pre-training task that is close to the problem of relative pose estimation, and a model pre-trained with Caiman can be fine-tuned to determine a relative rotation R∈ SO(3) and a relative translation t∈ $\mathbb{R}^3$ between two views of a given scene for a given camera.

In the task specific machine learning model for pose estimation, the two images are independently fed into the task specific encoder, which may have the same structure as the encoder 430 of the Caiman machine learning model, and is initialized by the training module 50 with the parameters of the pre-trained Caiman encoder 430. The two representations generated are input into the parameter module g 462 to estimate the alignment parameter Ω between the two image representations. This parameter is given as input of a rotation and a translation head that determines, for example, a 3×3 matrix and a 3D translation vector t, respectively. These heads may be implemented using Multi-Layer Perceptrons (MLPs) in various implementations with a predetermined number of hidden layers (e.g., 64, 128, 196, 256). The 3×3 matrix is further orthonormalized into a rotation matrix R using the special orthogonal Procrustes orthonormalization, such as described in Brégier, Deep regression on manifolds: a 3D rotation case study", 3DV, 2021, which is incorporated herein in its entirety.

The downstream model is fine-tuned by the training module 50 in a supervised manner to minimize a pose estimation error such as:

$$\mathcal{L}_p = \|R - R_{gt}\|_F^2 + \lambda \|t - t_{gt}\|_F^2 \quad (6)$$

with respect to the ground truth relative pose $(R_{gt}, t_{gt}) \in$ SO(3)× $\mathbb{R}^3$. In one embodiment λ=0.1 m$^{-2}$. However, another suitable value may be used.

The following presents experimental results for monocular depth estimation and pose estimation pre-trained with the described self-supervised Caiman process. The experimental results have been achieved with an implementation of the Caiman model in PyTorch. The Caiman machine learning model may be pre-trained with the RAdam optimizer.

TABLE 4

Error of relative pose estimation for different training set sizes.

| Training | 10k | 20k | 30k | 60k |
|---|---|---|---|---|
| From scratch | 19.1°, 0.99 m | 17.4°, 0.91 m | 15.3°, 0.81 m | 14.0°, 0.73 m |
| Fine-Tuning | 19.0°, 0.93 m | 16.2°, 0.81 m | 12.7°, 0.67 m | 11.5°, 0.61 m |

The experiments may be performed on synthetic images of 3D indoor scenes. In each scene, up to 1,000 pairs of camera viewpoints with a co-visibility greater than 50% have been randomly sampled. These pairs of viewpoints have been rendered using a simulator. Images of size 256×256 may be used and random crops of size 224×224 may be used as input images. In total, 800,000 pairs from different indoor scenes may be used for pre-training the Caiman machine learning model. While example numbers of pairs, viewpoints, samplings, and sizings have been provided, the present application is also applicable to other values.

For the relative pose estimation downstream task, a training (resp. test) set may include 200,000 (resp. 20,000) pairs may additionally be created, in a similar manner, from indoor scenes unseen during the Caiman pre-training process. To evaluate the performances for relative pose estimation of a model, subsets of different sizes may be considered and the task specific machine learning model may be fine-tuned for 100 epochs.

Table 4 compares the results obtained when training the task specific machine learning model for relative pose estimation from scratch (including the encoder and the decoder) with results obtained when the task specific model was fine-tuned from a pretext machine learning model pre-trained using the described cross-view alignment process. Table 4 illustrates that the pre-training is consistently beneficial to the performance of the model for this task.

For monocular depth estimation, the respective task specific machine learning model may be fine-tuned on 20,000 images randomly selected from the downstream task training set used for relative pose estimation. The fine-tuned task specific machine learning model may be evaluated on the corresponding test set. To evaluate the quality of the predicted depth, the Acc@1.25 may be used, involving the ratio of pixels satisfying $\max(d/\bar{d},\bar{d}/d)<1.25$, with d and $\bar{d}$ the predicted and ground-truth depth, respectively.

The performance of the Caiman pre-training may be been empirically evaluated for the downstream geometric vision task of monocular depth estimation. The task specific machine learning model outputs scalar values that are exponentiated (e.g., input to an exponential function) to enforce positive depth predictions. The task specific model may be fine-tuned by the training module 50 to minimize a MSE loss between depth predictions and ground-truth depth values, such as in log-space. In Table 5, the performance obtained when training the task specific machine learning model for monocular depth estimation from scratch (both encoder and decoder) is compared to the performance of a task specific machine learning model when Caiman pre-trained. A performance gain when using the pre-trained model is observed, with performance increasing from 0.39 to 0.48.

TABLE 5

Monocular depth estimation (preliminary results after 100000 training steps)

| Training | Depth Acc @1.25 (%) |
|---|---|
| From scratch | 0.39 |
| Fine-Tuning | 0.48 |

Figure 5:
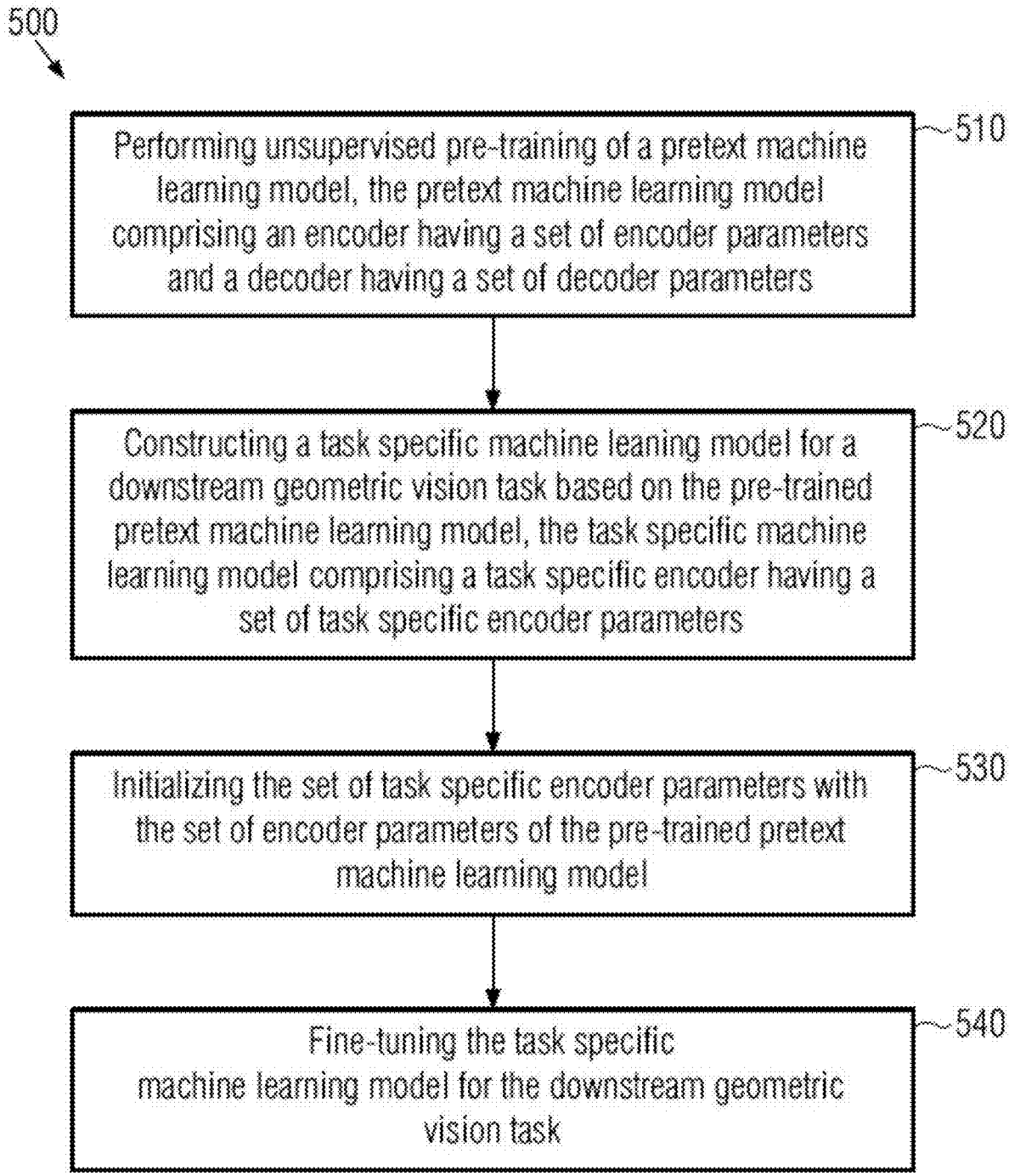
FIG. 5 is a flowchart illustrating an example method of training a task specific machine learning model on a downstream geometric vision task.

FIG. 5 is a flowchart illustrating a computer-implemented method 500 of training a task specific machine learning model for a downstream geometric vision task. The method begins with 510 with the training module 50 performing unsupervised pre-training of a pretext machine learning model (e.g., pretext machine learning model 130). In an example, the unsupervised pre-training may be self-supervised pre-training. The pretext machine learning model includes an encoder (e.g., encoder 230, 330, or 430) and a decoder (e.g., decoder 270, 370, or 470). The encoder has a set of encoder parameters and the decoder has a set of decoder parameters. The unsupervised pre-training may be performed according to unsupervised pre-training 110 of FIG. 1.

At 520, a task specific machine leaning model (e.g., task specific machine learning model 170) is constructed or obtained for a downstream geometric vision task (e.g., a 3D geometric task in computer vision such as depth estimation, optical flow estimation, or relative pose estimation) based on the pre-trained pretext machine learning model. The task specific machine learning model includes a task specific encoder having a set of task specific encoder parameters. The task specific machine learning model may additionally include a task specific decoder having a set of task specific decoder parameters. In some embodiments the task specific encoder has the same structure as the encoder of the pretext machine learning model. Additionally, the task specific decoder may have the same structure as the decoder of the pretext machine learning model.

The method continues at 530 with the training module 50 initializing the set of task specific encoder parameters with the set of encoder parameters of the pre-trained pretext machine learning model. In some embodiments the set of task specific decoder parameters are initialized by the training module 50 with the set of decoder parameters of the pre-trained pretext machine learning model.

At 540, the task specific machine learning model is fine-tune trained by the training module 50 for the downstream geometric vision task. In some embodiments, the fine-tuning is performed as supervised fine-tuning, which is based on a training data set of annotated images or pairs of annotated images in accordance with supervised fine-tuning 150 of FIG. 1.

Performing the fine-tuning of the task specific machine learning model for the downstream geometric vision task starts with applying the task specific machine learning model to one or more images (e.g., annotated images). For monocular downstream geometric vision tasks (e.g., monocular depth estimation) the task specific machine learning model may be applied to one input image; for binocular downstream geometric vision tasks (e.g., binocular depth estimation, relative pose estimation, image flow estimation) the task specific machine learning model may be applied to a pair of input images. The images of the image pair may depict a same visual content (a same scene) but may have been taken from different viewpoints or under different conditions (e.g., different focal length, different depth of field, different lighting conditions, different seasons).

The task specific encoder may generate a respective image representation for each input image. In some examples, the one or more image representations are input into the task specific decoder to generate a decoded image representation. Either the one or more image representations or the decoded image representation may be input to a task specific output layer of the task specific machine learning model (e.g., a 2D convolution layer or a Multi-Layer Perceptron) to create task specific output data (e.g., a depth map of the scene, a relative rotation matrix, and a relative translation vector) according to the downstream geometric vision task. The one or more annotated images are annotated with ground truth data corresponding to the downstream geometric vision task. The value of a task specific loss function may be determined by the training module 50 based on a metric quantifying (corresponding to) the difference between the created output data and the ground truth data. Subsequently, the task specific machine learning model is adjusted by the training module 50 adjusting the set of task specific encoder parameters (and optionally the set of task specific decoder parameters) of the task specific machine learning model, such as based on or to minimize the value of the task specific loss function.

The next iterative step may start with or include applying the adjusted task specific machine learning model to one or more annotated images to generate new task specific output data, determining a new value for the task specific loss function and further adjusting the learnable parameters of the task specific encoder (and optionally the task specific decoder). This iterative process stops either after a predetermined number of iterations (e.g., epochs), or when a minimum value of the task specific loss function is reached (the minimization of the loss function has converged).

Once the task specific machine learning model has been fine-tuned for the downstream geometric vision task, the model can be applied to perform the downstream geometric vision task on a set of images. The fine-tuned model is applied to one or more unannotated images in the same way as in an iteration step of the fine-tuning phase (e.g., fine-tuning 150) to create task specific output (or prediction) data based on the input image(s). However, the determination of the value of the loss function and the iterative adjustment of the task specific machine learning model is not performed in the application phase.

In one example, the task specific machine learning model is fine-tuned for relative pose estimation. In this example, the fine-tuned task specific machine learning model is applied to a pair of new images that have not been part of the pre-training or fine-tuning data sets. The images of the pair of new images depict two views of the same scene (depict the same scene from different viewpoints). By applying the fine-tuned model to the pair of new images, a relative rotation and a relative translation between the views of the images of the new pair of images is determined by the task specific machine learning model as the prediction data.

In an example, the downstream geometric vision task for which the task specific machine learning model is fine-tuned is depth estimation. Depth estimation can be performed in a monocular (using a single image) and a binocular (using two images) manner. In the monocular case, the fine-tuned task specific machine learning model is applied to a new image (which was not part of the pre-training or fine-tuning data sets) to extract a depth map of the new image as the prediction data. In the binocular case, the fine-tuned task specific machine learning model is applied to a pair of new images which depict the same scene from different viewpoints to extract a depth map for the depicted scene as the output prediction data.

In yet another example, the task specific machine learning model is fine-tuned for optical flow estimation. For this downstream geometric vision task, the fine-tuned task specific machine learning model is applied to a new image pair (which was not part of the pre-training or fine-tuning data sets) including a new first image and a new second image. The new first and second images depict the same scene under different conditions or from different viewpoints. When applied to the new image pair, the fine-tuned task specific machine learning model identifies a plurality of pixel pairs as the prediction data. Each pixel pair includes one pixel of the new first image and one corresponding pixel in new the second image, where the pixels of a pair correspond to the same visual feature of the depicted scene. From pairs of pixels the motion of identified visual feature(s) of the depicted scene between the new first image and the new second image are determined by the task specific machine learning model.

In the following section, the pre-training 510 of FIG. 5 is discussed in more detail with reference to FIGS. 6, 7, and 8.

Figure 6:
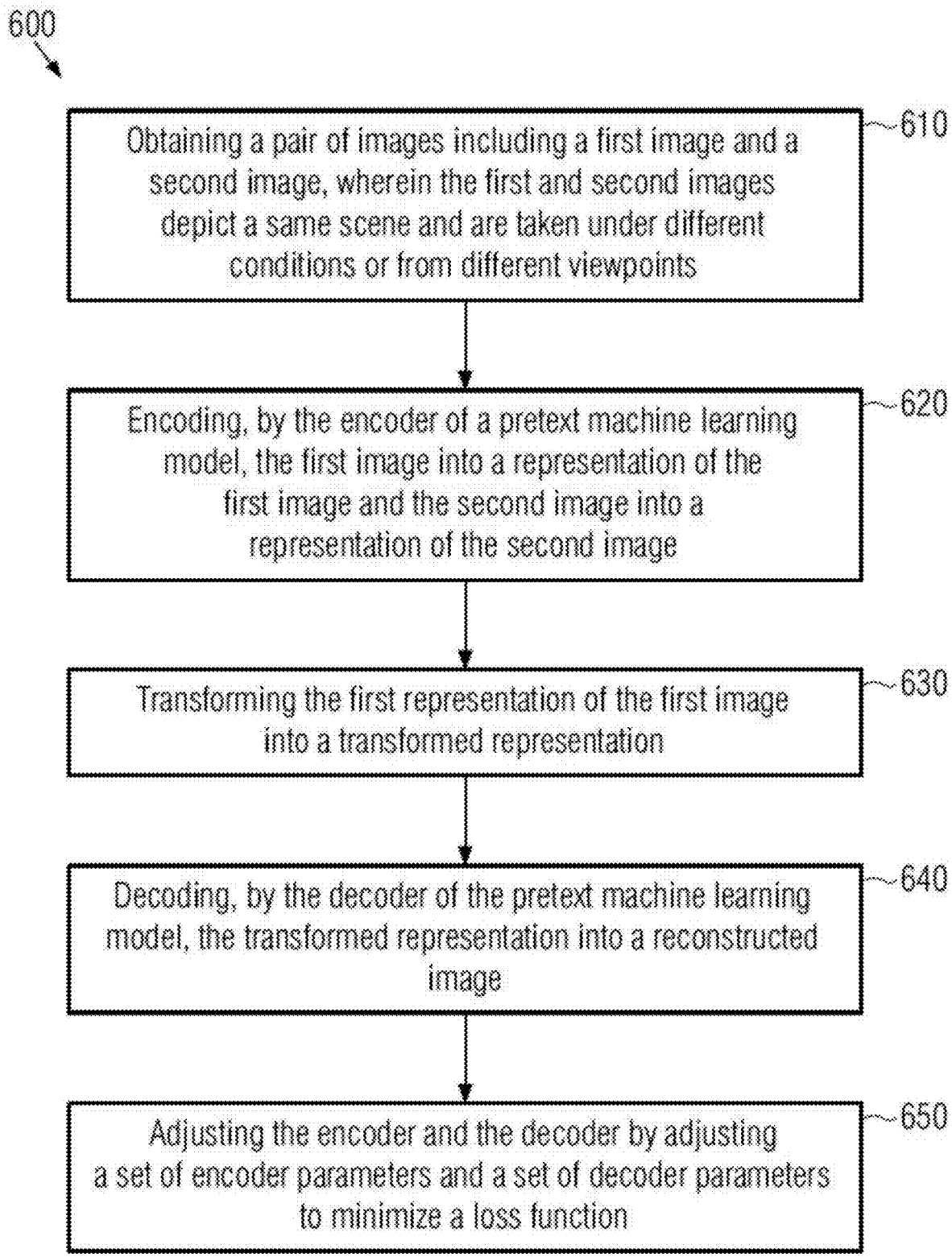
FIG. 6 is a flowchart illustrating a method for unsupervised pre-training of a pretext machine learning model on a pretext task.

FIG. 6 is a flowchart illustrating a computer-implemented method 600 of pre-training a pretext machine learning model (e.g., pretext machine learning model 130) for a pretext task. 600 provides an example implementation of unsupervised pre-training of 510 of FIG. 5. The pretext machine learning model includes an encoder (e.g., encoder 230, 330, or 430) and a decoder (e.g., decoder 270, 370, or 470). The encoder has a set of encoder parameters and the decoder has a set of decoder parameters.

The method begins with 610 with obtaining a pair of unannotated images including a first image (e.g., image 120, 310, or 410) and a second image (e.g., image 122, 320, or 420). The first and second images depict a same scene taken under different conditions (e.g., different focal length, different lighting conditions, different seasons) or from different viewpoints.

At 620, the encoder of the pretext machine learning model encodes the first image into a first representation (e.g., image representation 240, 340, or 440). Additionally, the second image is encoded into a second representation (e.g., image representation 250, 350, or 450) by the encoder.

The first representation is transformed into a transformed representation (e.g., transformed representation 264, 364, or 468) at 630. The transformation may be performed in representation space block 260, cross-view completion block 360, or cross-view alignment block 460. The transformed representation is decoded into a reconstructed image (e.g., reconstructed image 140, 380, or 480) by the decoder of the pretext machine learning model at 640. The reconstructed image is based on the first and the second representation in that either the transformation of the first representation depends on the second representation or the decoder takes both the transformed representation and the second representation as input and decodes the first representation into the reconstructed image conditioned on the second representation.

At 650, the encoder and the decoder are adjusted (i.e., updated or modified) by the training module 50 by adjusting their respective sets of encoder and decoder parameters based on or to minimize a loss function (minimize the value of the loss function (e.g., pretext loss 142)). By adjusting the encoder and decoder parameters, the pretext machine learning model is adjusted such that it better performs the pretext task after the adjustment. The pretext machine learning model may include further learnable parameters, e.g., as part of a representation space block such as representation space block 260. These optional additional learnable parameters are also adjusted based on minimizing the loss function. In order to minimize the loss function, the pretext loss (the value of the loss function) may be determined based on a deviation of the reconstructed image to an image it is meant to reconstruct (e.g., one of the images of the input image pair). Additionally or alternatively, the loss may be determined based on a deviation of the transformed representation to one of the image representations generated by applying the encoder to the images of the input image pair. Adjusting the learnable parameters of the pretext machine learning model (including the parameters of the encoder and the decoder) is performed by back propagation (e.g., back propagation 144). After adjusting the pretext machine learning model, the process may stop or repeat. In case the process repeats, a new iteration is started 610 with the adjusted pretext machine learning model including the adjusted encoder and decoder. The process may stop after a predetermined number of iterations (e.g., epochs) or when a minimum value of the pretext loss function is reached (e.g., the value of the pretext loss function has converged towards or to a minimum value).

Figure 7:
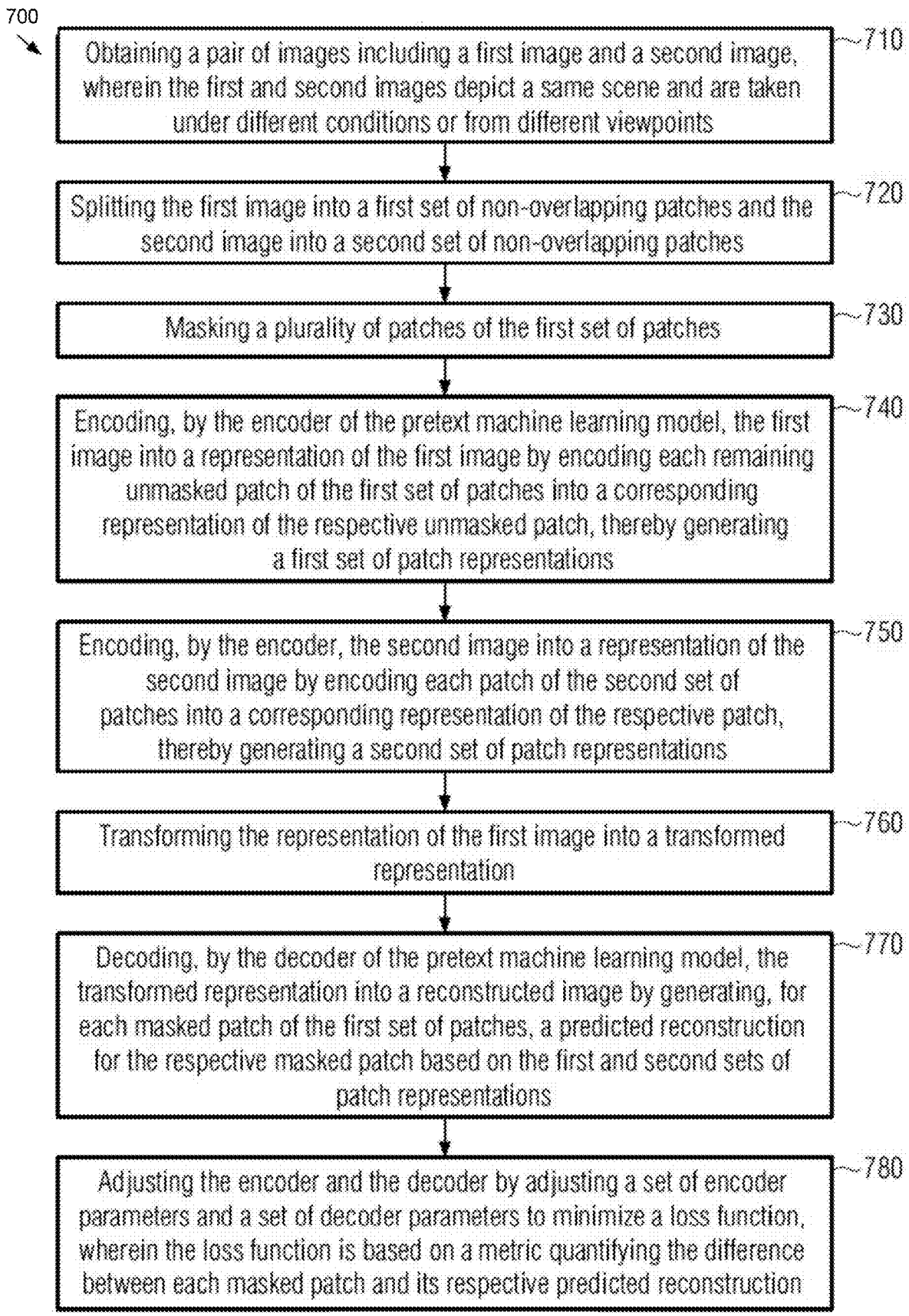
FIG. 7 is a flowchart illustrating a method for self-supervised cross-view completion pre-training of a pretext machine learning model.

FIG. 7 is a flowchart depicting an example computer-implemented method 700 of performing cross-view completion pre-training of a pretext machine learning model (e.g., pretext machine learning model 130) for the cross-view completion pretext task. Method 700 provides an example implementation of pre-training step 510 of FIG. 5 and is an example embodiment of method 600 for the specific pretext task of cross-view completion. The pretext machine learning model comprises an encoder (e.g. 330) and a decoder (e.g. decoder 370). The encoder has a set of encoder parameters and the decoder has a set of decoder parameters.

Method 700 starts at 710 with obtaining a pair of images including a first image (e.g., image 310) and a second image (e.g., image 320). The first and second images depict the same scene (the same visual content) and are taken under different conditions or from different viewpoints. Accordingly, the two images of the pair of images show the same visual content but from different viewpoints or with different lighting, different depth of field, different focal length, or other differences. In particular, the pixel content of the two images of the image pair differs from each other but depicts the same scene. Each image of the image pair provides a distinct view of the depicted scene, which differs from the view provided by the other image of the pair.

At 720 the method continues with splitting the first image into a first set of non-overlapping patches (e.g., image patches 312) and splitting the second image into a second set of non-overlapping patches (e.g., image patches 322). At 730 a plurality of patches of the first set of patches is masked. In an example, a predetermined percentage (e.g., between 75% and 95%) of the patches of the first set of patches is randomly selected to be masked and masked.

After splitting the first image, the encoder encodes the first image at 740 into a first representation (e.g., image representation 340) by encoding each remaining unmasked patch of the first set of patches into a corresponding representation (e.g., patch representation 342) of the respective unmasked patch, thereby generating a first set of patch representations. Encoding the first image into the first representation comprises encoding only the unmasked patches into the first set of patch representations such that the first set of patches do not include patch representations for the masked patches (e.g., masked patches 314).

At 750, the encoder encodes the second image into a second representation (e.g., image representation 350) by encoding each patch of the second set of patches into a corresponding representation (e.g., patch representation 352) of the respective patch, thereby generating a second set of patch representations. 740 and 750 are an implementation of 620 of FIG. 6 for the CroCo pretext task.

At 760, the first representation of the first image is transformed into a transformed representation (e.g., transformed representation 364). In an example, the first representation is transformed into the transformed representation by padding the first set of patch representations, which includes only patch representations for unmasked patches of the first image, with a respective learned representation (e.g., learned representation 362) for each of the masked patches of the first image. Each learned representation of a masked patch includes a set of learnable representation parameters. The resulting transformed representation may include each of the patch representations of the first set of patch representations (e.g., patch representation 342) and additionally a plurality of learned patch representations corresponding to the masked patches (e.g., learned patch representation 362).

Following the transformation of the first representation, the method continues at 770 with decoding, by the decoder, the transformed representation into a reconstructed image (e.g., reconstructed image 380). The transformed representation is decoded by generating, for each masked patch of the first set of patches, a predicted reconstruction for the respective masked patch based on the first and second sets of patch representations. In an example, generating the predicted reconstruction of a masked patch of the first set of patches includes decoding, by the decoder, the learned representation of the masked patch into the predicted reconstruction of the masked patch. For decoding the learned representation of a masked patch, the decoder receives the first and second sets of patch representations as input data and decodes the learned representation of the masked patch based on the input data. In some examples, the transformed representation includes the patch representations of the first set of patch representations and the transformed representation is decoded into the reconstructed image conditioned on the second representation.

At 780, the encoder and the decoder are adjusted (e.g., updated or modified) by adjusting their corresponding sets of encoder and decoder parameters to minimize a loss function (e.g., minimize the value of the loss function (e.g., pretext loss 142)). In an example, the loss function may be based on a metric quantifying the difference between each masked patch of the first image and its respective predicted reconstruction. In an example, the pretext machine learning model may include sets of learnable parameters of the learned representations corresponding to the masked patches of the first image. In this example, the additional learnable parameters and thereby the learned representations are also adjusted to minimize the loss function. By adjusting the encoder and decoder parameters and optionally the parameters of the learned representations, the pretext machine learning model is adjusted such that it better performs the cross-view completion task after the adjustment. Adjusting the learnable parameters of the pretext machine learning model (including the parameters of the encoder and the decoder) is performed by back propagation (e.g., back propagation 144). After adjusting the pretext machine learning model, the process may stop or repeat. In case the process repeats, a new iteration is started at 710 for the adjusted pretext machine learning model including the adjusted encoder and decoder (and optionally the adjusted learnable representations). The process may stop after a predetermined number of iterations are completed or when a minimum value of the pretext loss function is reached (e.g., the value of the pretext loss function has converged towards or to a minimum value).

Figure 8:
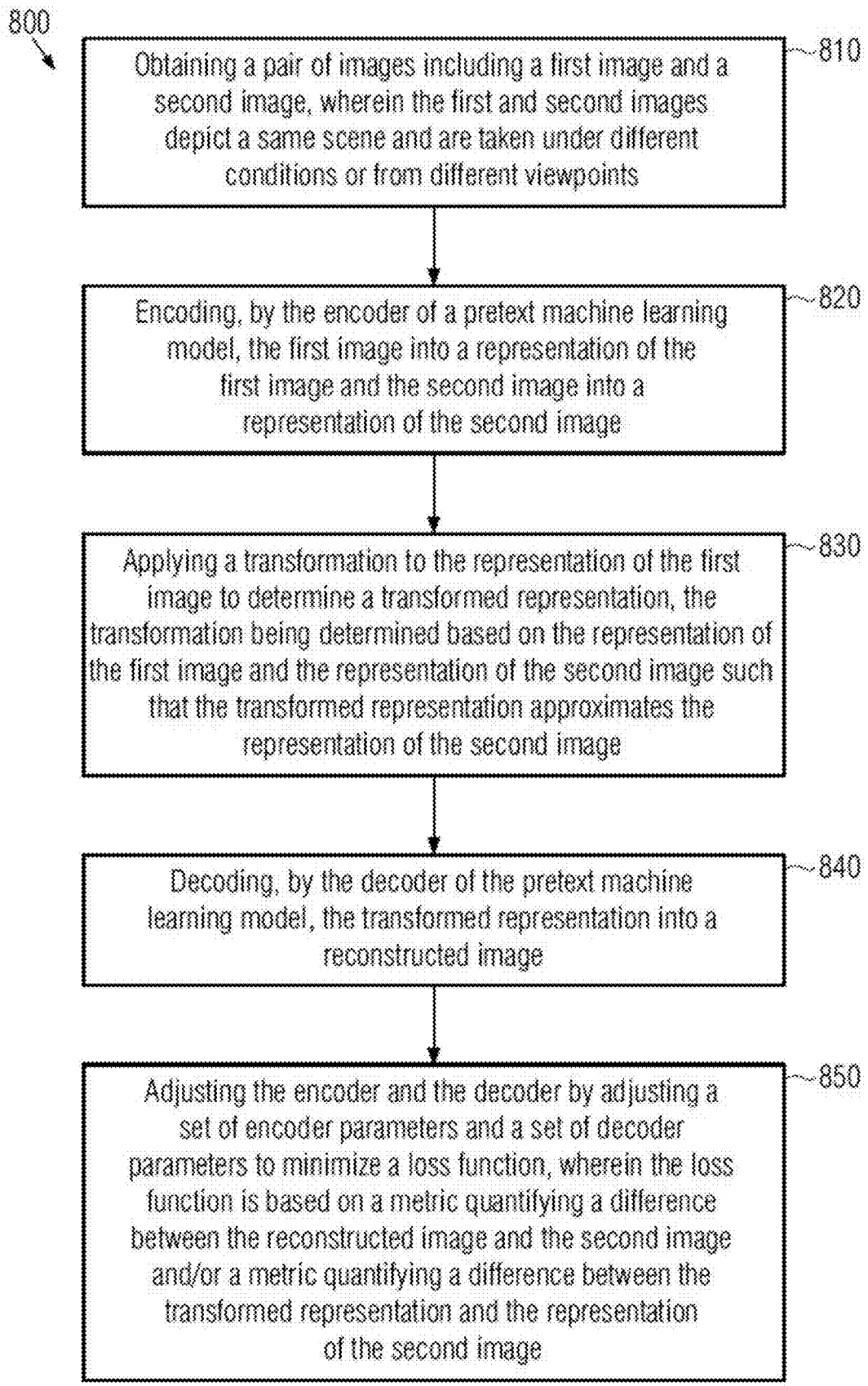
FIG. 8 is a flowchart illustrating a method for self-supervised cross-view completion pre-training of a pretext machine learning model.

FIG. 8 includes a flowchart of an example computer-implemented method 800 of pre-training 510 of FIG. 5, namely a computer-implemented method of performing cross-view alignment pre-training of a pretext machine learning model (e.g., pretext machine learning model 130) for the cross-view alignment pretext task. Method 800 is an example of method 600 for the specific pretext task of cross-view alignment. The pretext machine learning model includes an encoder (e.g. encoder 430) and a decoder (e.g. decoder 470). The encoder has a set of encoder parameters and the decoder has a set of decoder parameters.

The method begins with 810 with obtaining a pair of images including a first image (e.g., source image 410) and a second image (e.g., target image 420), where the first and second images depict a same scene and are taken under different conditions or from different viewpoints. Accordingly, the two images of the pair of images show the same visual content but from different viewpoints or with different lighting, different depth of field, different focal length, or other visual differences of the same scene. In particular, the pixel content of the two images of the image pair differs from each other but includes the same scene. Each image of the image pair provides a distinct view on the depicted scene, which differs from the view provided by the other image of the pair.

Method 800 continues at 820 with encoding, by the encoder of the pretext machine learning model, the first image into a first representation (e.g., source representation 440) of the first image and the second image into a second representation (e.g., target representation 450) of the second image. In an example, the first representation may be a first set (e.g., an ordered set) of n vectors $\{x_{1,i}\}_{i=1\ldots n}$, each $x_{1,i} \in \mathbb{R}^K$. Equally, the second representation may be a second set (e.g., an ordered set) of n vectors $\{x_{2,i}\}_{i=1\ldots n}$, each $x_{2,i} \in \mathbb{R}^K$.

At 830, the first representation is transformed into a transformed representation (e.g., transformed source representation 468) by applying a transformation (e.g., transformation 466) to the first representation. The transformation is determined based on the first and second representations such that the transformed representation approximates (e.g., aligns with) the second representation. The transformation may depend on a set of transformation parameters (e.g., parameters Ω 464) which may be determined by a parameter module (e.g., parameter module 462) based on the first representation and the second representation. In some examples, each vector of the first and second sets of vectors are decomposed in a D-dimensional equivariant part and a (K−D)-dimensional invariant part, where D is a natural number between one and K. In this example, applying the transformation includes decomposing each vector and applying a (D×D)-dimensional transformation matrix Ω to the equivariant part of each vector of the first set of vectors. Applying the transformation to any vector of the first and second sets of vectors does not change the invariant part of the respective vector. Applying the transformation matrix Ω to the equivariant part of a vector may be performed by multiplying the transformation matrix Ω with the equivariant part of the vector. The transformation matrix Ω may be determined to align the equivariant parts of the vectors of the first set of vectors with the equivariant parts of the respective vectors of the second set of vectors. In some embodiments, the transformation may be a D-dimensional rotation and the transformation matrix Ω may be a D-dimensional rotation matrix. For these embodiments, the transformation matrix Ω may be determined according to the equation:

$$\Omega = \arg\min_{\hat{\Omega} \in SO(D)} \sum_{i=1}^{n} \left\| \hat{\Omega} x_{1,i}^{equiv} - x_{2,i}^{equiv} \right\|^2$$

where $x_{1,i}^{equiv}$ denotes the equivariant part of vector $x_{1,i}$ and $x_{2,i}^{equiv}$ denotes the equivariant part of vector $x_{2,i}$. SO(D) denotes the D-dimensional rotation group (i.e. the special orthogonal group of dimension D). The function "arg" in the above equation denotes that the return value is not the minimal value of the sum but the matrix $\hat{\Omega}$ for which the minimal value of the sum is achieved.

At 840 the decoder decodes the transformed representation into a reconstructed image (e.g., reconstructed image 480).

At 850, the encoder and the decoder are adjusted (i.e. updated or modified) by adjusting their corresponding sets of encoder and decoder parameters to minimize a loss function (minimize the value of the loss function (pretext loss 142)). The loss function is based on a metric quantifying a difference between the reconstructed image and the second image. Additionally or alternatively, the loss function may be based on a metric quantifying a difference between the transformed representation and the second representation. By adjusting the encoder and decoder parameters, the pretext machine learning model is adjusted such that it better performs the cross-view alignment task after the adjustment. Adjusting the learnable parameters of the pretext machine learning model (including the parameters of the encoder and the decoder) may be performed by back propagation (e.g. back propagation 144). After adjusting the pretext machine learning model, the process may stop or repeat. In case that the process repeats, a new iteration is started at 810 with the adjusted pretext machine learning model including the adjusted encoder and decoder. The process may stop after a predetermined number of iterations are complete or when a minimum value of the pretext loss function is reached (e.g., the value of the pretext loss function has converged towards or to a minimum value).

The two pretext tasks of cross-view completion and cross-view alignment may be combined for training a task specific machine learning model on a downstream geometric vision task. For this purpose, several techniques for combining the methods may be implemented. In a one example (which may be called "early fusion approach"), two separate pretext machine learning models are pre-trained by the training module 50. The first pretext machine learning model is pre-trained according to the cross-view completion pre-training method 700. The second pretext machine learning model is pre-trained according to the cross-view alignment pre-training method 800. This results in two pre-trained encoders, one being pre-trained on the CroCo pretext task and the other being pre-trained on the Caiman pretext task. A task specific machine learning model (e.g., model 170) for the downstream geometric vision task is constructed by the training module 50 based on or with both of these pre-trained encoders. In one example, supervised fine-tuning (e.g., supervised fine-tuning 150) is performed by the training module 50 by feeding one or more input images to the first pre-trained encoder resulting in one or more first representations for the one or more input images. Equally, the one or more input images are fed to the second pre-trained encoder by the training module 50, which results in one or more second representations for the one or more input images. Subsequently, a joined representation is generated by the training module 50 for each of the one or more input images by concatenating the first and second representations for the respective image. Finally, the joined representations are input in a final task specific layer (e.g., a Multi-layer Perceptron) of the task specific machine learning model. The task specific layer generates task specific output data according to the downstream geometric vision task and a task specific loss (e.g., loss 182) is determined by the training module 50 based on the output data and the annotated ground truth data of the one or more input images. Finally, the learnable parameters (including the parameters of the encoders and the parameters of the task specific layer) of the task specific machine learning model are adjusted by the training module 50 such as by back propagation (e.g., back propagation 184).

Figure 9:
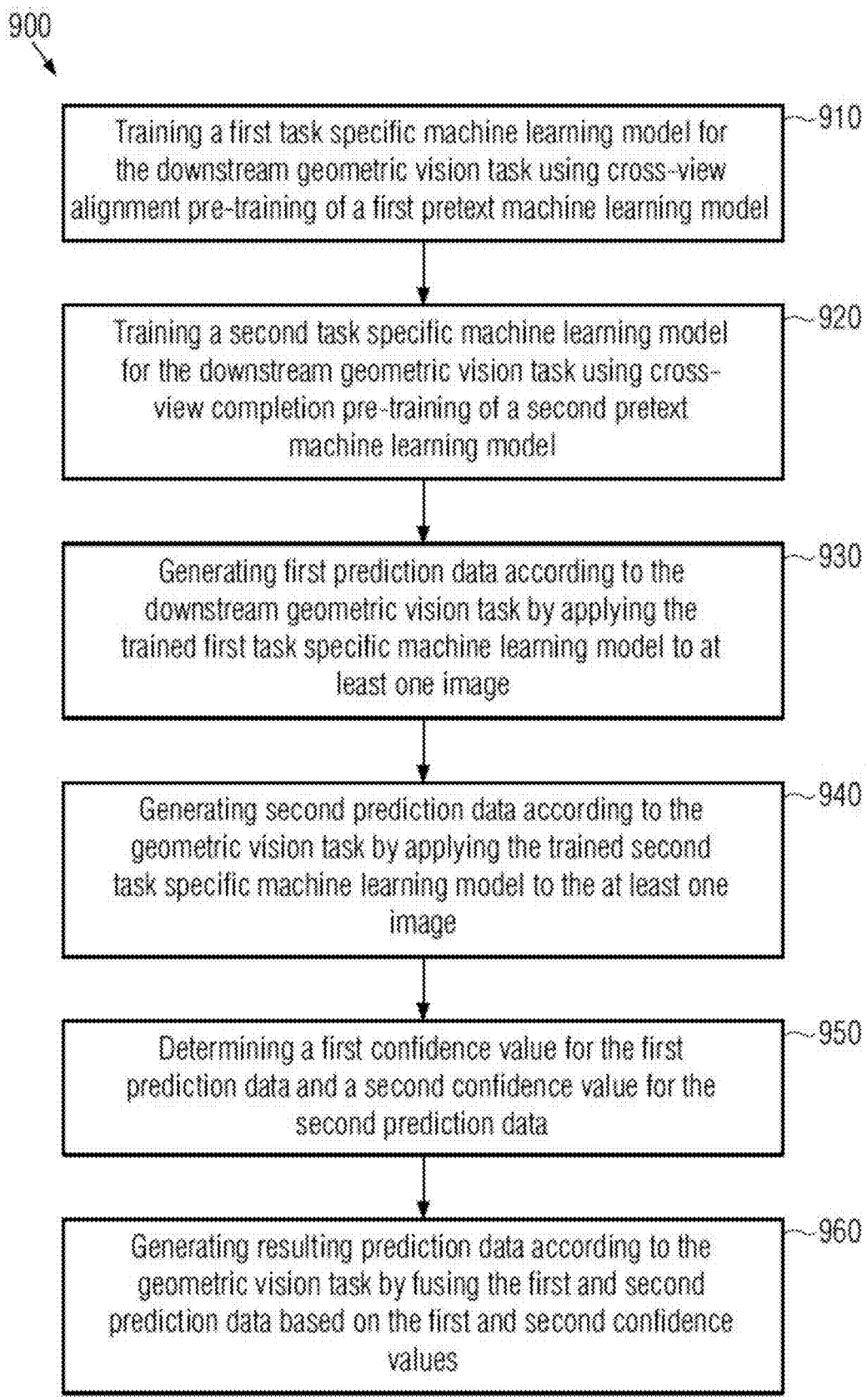
FIG. 9 is a flowchart illustrating a method for generating prediction data according to a down-stream geometric vision task combining the self-supervised cross-view completion pre-training of FIG. 7 and the self-supervised cross-view alignment pre-training of FIG. 8.

In another example, (which may be called "late fusion approach") for combining cross-view completion pre-training and cross-view alignment pre-training is shown in FIG. 9, which is a flowchart illustrating a computer-implemented method 900 of generating prediction data for a downstream geometric vision task. Method 900 begins at 910 with training a first task specific machine learning model (e.g., model 170) for the downstream geometric vision task using cross-view alignment pre-training of a first pretext machine learning model (e.g., model 130). The training of the first task specific machine learning model is performed according to method 500, where pre-training step 510 is implemented in accordance with the cross-view alignment pre-training method 800.

At 920, a second task specific machine learning model is trained for the downstream geometric vision task using cross-view completion pre-training of a second pretext machine learning model. The training of the second task specific machine learning model is performed according to method 500, where pre-training 510 is implemented in accordance with cross-view completion pre-training method 700. 910 and 920 may be performed sequentially in any order or in parallel.

At 930 and 940 the two separately trained task specific machine learning models are applied to at least one image to extract respective prediction data from the at least one image. 930 and 940 can be performed sequentially in any order or in parallel. Specifically, first prediction data according to the downstream geometric vision task are generated at 930 by applying the trained first task specific machine learning model to the at least one image. At 940 second prediction data according to the geometric vision task are generated by applying the trained second task specific machine learning model to the at least one image. At 950 a first confidence value is determined for the first prediction data and a second confidence value is determined for the second prediction data. The first confidence value may indicate an expected (e.g., estimated) accuracy of the first predicted data with respect to the downstream geometric vision task. Similarly, the second confidence value may indicate an expected (e.g., estimated) accuracy of the second predicted data with respect to the downstream geometric vision task. The first and second confidence values may be determined by applying the respective trained task specific machine learning model to a test set of annotated images and by comparing the resulting extracted prediction data for the annotated images of the test set to the annotated ground truth data of the annotated images of the test set. As indicated in FIG. 9, 950 may be performed after 930 and 940 and before 960. However, 950 may be performed at any point after 910 and 920 and before 960. In particular, 950 may be performed before 930 and 940 or between these 930 and 940.

The method concludes at 960 generating resulting prediction data according to the geometric vision task by fusing the first and second prediction data based on the first and second confidence values. Fusing the first and second prediction data may include determining a weighted sum of the prediction data, where the weights are based on the respective confidence values.

Although the above examples have been described within the context of methods, they also represent a description of a corresponding component, module, or feature of a corresponding apparatus or system. Some or all of the method functions may be implemented by a computer in that they are executed by (or using) one or more processors, microprocessors, electronic circuits, and/or processing circuitry.

Figure 10:
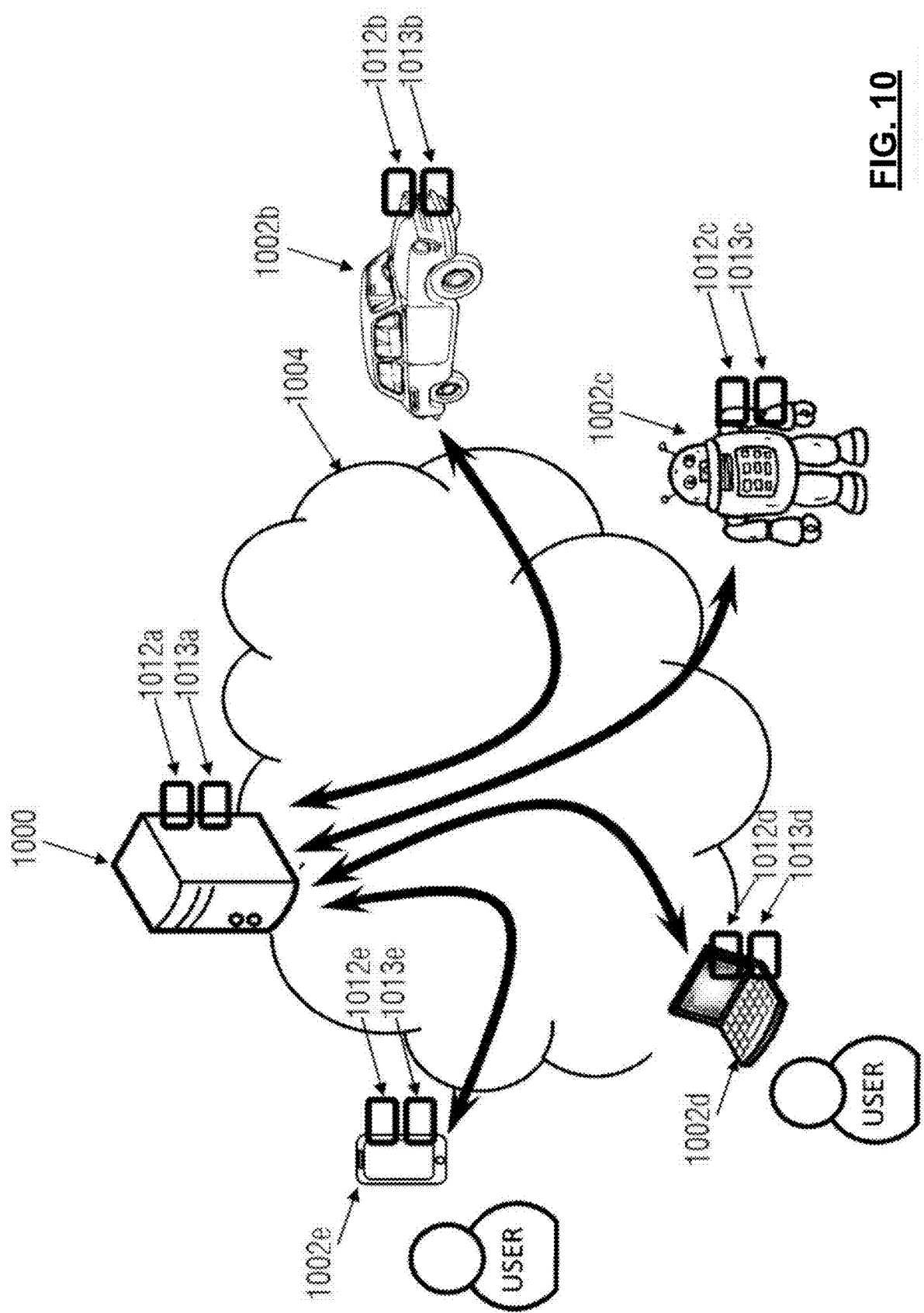
FIG. 10 illustrates an example functional block diagram of an architecture of a system.

The above-mentioned methods and features may be implemented within an architecture such as illustrated by the functional block diagram of FIG. 10, which includes server 1000 and one or more computing devices (collectively 1002) that communicate over a network 1004 (which may be wireless and/or wired), such as the Internet, for data exchange. Server 1000 and the computing devices 1002 each include a one or more processors 1012 and memory 1013 such as a hard disk. The computing devices 1002 may include any computing device that communicates with server 1000, such as an autonomous vehicle 1002*b*, robot 1002*c*, computer 1002*d*, or cell phone 1002*e*, or another suitable type of computing device.

In an example, method 500 of training a task specific machine learning model for a downstream geometric vision task is performed in combination with pre-training methods 600, 700, or 800 at server 1000. The server may provide the trained task specific machine learning model to any of the devices, which may then extract prediction data according to the downstream geometric vision task from one or more images by applying the trained machine learning model to the input one or more images. In an example, one of the devices performs method 500 in combination with pre-training methods 600, 700, and 800 to training the task specific machine learning model for the downstream geometric vision task and subsequently applies the trained task specific machine learning model to one or more images to extract prediction data according to the downstream geometric vision task from the one or more images. In various implementations, one of the devices performs method 900 for generating prediction data according to the downstream geometric vision task.

In a further embodiment, an autonomous apparatus (e.g., vehicle 1002*b* or robot 1002*c*) may include an optical sensor (e.g., a camera), which generates a first image of the surroundings of the apparatus. The autonomous apparatus may additionally include a second optical sensor (e.g., a second camera), which generates a second image of the surroundings of the apparatus. The first image and the second image depict the surroundings of the apparatus of the apparatus from different viewpoints. Alternatively, the autonomous apparatus does not include a second optical sensor but stores the second image of the surroundings of the apparatus on a memory device (e.g., memory device 1013b/c). The stored second image may have been generated by the optical sensor at an earlier time. The autonomous apparatus may train a task specific machine learning model for a downstream geometric vision task according to method 500 in combination with pre-training method 600, 700, or 800. Alternatively, the autonomous apparatus may receive a trained task specific machine learning model from the server, where the server has trained the task specific machine learning model for the downstream geometric vision task according to method 500 in combination with pre-training method 600, 700, or 800. The autonomous apparatus may apply the trained task specific machine learning model to one or more images to extract prediction data from the one or more images according to the geometric vision task. The autonomous apparatus may further adapt its motion state (e.g., velocity or direction of motion) or its operation based on the extracted prediction data. In other words, the autonomous apparatus may adjust its speed and/or steering based on the extracted prediction data.

In one embodiment the downstream geometric vision task for which the task specific machine learning model has been trained is monocular depth estimation. The autonomous apparatus applies the trained task specific machine learning model to the first image thereby extracting a depth map from the first image, where the depth map corresponds to the surroundings of the autonomous apparatus. The depth map includes a pixel-wise or patch-wise indication of a respective relative distance to a nearest item in the pixel or the patch to the camera taking the image. Based on the extracted depth map, the autonomous apparatus determines a distance to an object in the surroundings of the autonomous apparatus. Based on the determined distance to the object the autonomous apparatus adapts its velocity and/or its direction of motion.

In another embodiment, the downstream geometric vision task for which the task specific machine learning model has been trained is binocular depth estimation. The autonomous apparatus applies the trained task specific machine learning model to a pair of images thereby extracting a depth map from the pair of images, where the depth map corresponds to the surroundings of the autonomous apparatus. The depth map includes a pixel-wise or patch-wise indication of a respective relative distance of a nearest item in the pixel or the patch to the camera taking the image. The pair of images includes the first image generated by the optical sensor and the second image generated by the second optical sensor, where the images of the image pair are generated by the optical sensors at substantially the same time. Based on the extracted depth map, the autonomous apparatus determines a distance to an object in the surroundings of the autonomous apparatus. Based on the determined distance to the object, the autonomous apparatus adapts its velocity and/or its direction of motion. In other words, the autonomous apparatus may adjust its speed and/or steering based on the extracted distance data.

In yet another example, the downstream geometric vision task for which the task specific machine learning model has been trained is relative pose estimation. The autonomous apparatus applies the trained task specific machine learning model to a pair of images thereby extracting a relative rotation matrix and a relative translation vector from the pair of images. The pair of images includes the first image generated by the optical sensor and the second image stored at the memory of the apparatus, where the second image has been generated by the optical sensor or another optical sensor at an earlier time then the first image. The memory of the apparatus may additionally store position information of the second image. The position information may indicate a position of the apparatus at the earlier time with respect to the surroundings of the apparatus. Based on the extracted relative rotation matrix, the relative translation vector and the position information, the autonomous apparatus determines a new position of the apparatus with respect to the surroundings of the autonomous apparatus. Based on the determined new position the autonomous apparatus adapts its velocity and/or its direction of motion. In other words, the autonomous apparatus may adjust its speed and/or steering based on the determined position.

In another embodiment the downstream geometric vision task for which the task specific machine learning model has been trained is optical flow estimation. The autonomous apparatus applies the trained task specific machine learning model to a pair of images thereby extracting pairs of corresponding pixels for the pair of images. The pair of images includes the first image generated by the optical sensor and the second image stored at the memory of the apparatus, where the second image has been generated by the optical sensor at an earlier time then the first image. Each extracted pair of corresponding pixels includes one pixel from the first image and one corresponding pixel from the second image. Based on the extracted pairs of corresponding pixels the autonomous apparatus determines a velocity and/or a direction of motion of an object within the surroundings of the autonomous apparatus. Based on the determined velocity and/or direction of motion of the object, the autonomous apparatus adapts its velocity and/or its direction of motion. In other words, the autonomous apparatus may adjust its speed and/or steering based on the determined speed and/or direction of motion of the object, such as to avoid colliding with the object.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented machine learning method of training a task specific machine learning model for a downstream geometric vision task, the method comprising:
performing unsupervised pre-training of a machine learning model, the machine learning model comprising an encoder having a set of encoder parameters and a decoder having a set of decoder parameters,
wherein the performing of the unsupervised pre-training of the machine learning model includes:
obtaining a pair of unannotated images including a first image and a second image,
wherein the first and second images depict a same scene and are taken under different conditions or from different viewpoints;
encoding, by the encoder, the first image into a representation of the first image and the second image into a representation of the second image;
transforming the representation of the first image into a transformed representation;
decoding, by the decoder, the transformed representation into a reconstructed image,
wherein the transforming of the representation of the first image and the decoding of the transformed representation is based on the representation of the first image and the representation of the second image; and adjusting one or more parameters of at least one of the encoder and the decoder based on minimizing a loss;

constructing the task specific machine learning model for the downstream geometric vision task based on the pre-trained machine learning model, the task specific machine learning model comprising a task specific encoder having a set of task specific encoder parameters;

initializing the set of task specific encoder parameters with the set of encoder parameters of the pre-trained machine learning model; and fine-tuning the task specific machine learning model, initialized with the set of task specific encoder parameters, for the downstream geometric vision task.

2. The method of claim 1, wherein the unsupervised pre-training of the machine learning model is a cross-view alignment pre-training, and wherein the transforming of the representation of the first image includes applying a transformation to the representation of the first image to generate the transformed representation, the transformation being determined based on the representation of the first image and the representation of the second image such that the transformed representation approximates the representation of the second image.

3. The method of claim 1, wherein the unsupervised pre-training of the machine learning model is a cross-view alignment pre-training, and wherein the loss is based on a metric quantifying a difference between the reconstructed image and the second image.

4. The method of claim 1, wherein the unsupervised pre-training of the machine learning model is a cross-view alignment pre-training, and wherein the loss is based on a metric quantifying a difference between the transformed representation and the representation of the second image.

5. The method of claim 2, wherein the representation of the first image is a first set of n vectors $\{x_{1,i}\}_{i=1 \ldots n}$, each $x_{1,i} \in \mathbb{R}^K$, wherein the representation of the second image is a second set of n vectors $\{x_{2,i}\}_{i=1 \ldots n}$, each $x_{2,i} \in \mathbb{R}^K$, wherein the applying of the transformation includes decomposing each vector of the first and second sets of vectors in a D-dimensional equivariant part and a (K−D)-dimensional invariant part and applying a (D×D)-dimensional transformation matrix $\Omega$ to the equivariant part of each vector of the first set of vectors, wherein $0 < D \leq K$.

6. The method of claim 5, wherein the transformation is a D-dimensional rotation and $\Omega$ is a D-dimensional rotation matrix, and wherein $\Omega$ is set based on aligning the equivariant parts of the vectors of the first set of vectors with the equivariant parts of the respective vectors of the second set of vectors.

7. The method of claim 5, further comprising determining $\Omega$ based on the equation:

$$\Omega = \arg\min_{\hat{\Omega} \in SO(D)} \sum_{i=1}^{n} \|\hat{\Omega} x_{1,i}^{equiv} - x_{2,i}^{equiv}\|^2$$

where $x_{1,i}^{equiv}$ denotes the equivariant part of vector $x_{1,i}$, $x_{2,i}^{equiv}$ denotes the equivariant part of vector $x_{2,i}$, and SO(D) denotes the D-dimensional rotation group.

8. The method of claim 1, wherein the unsupervised pre-training is a cross-view completion pre-training, and wherein the performing of the cross-view completion pre-training of the machine learning model further comprises:

splitting the first image into a first set of non-overlapping patches and splitting the second image into a second set of non-overlapping patches; and masking ones of the patches of the first set of patches, wherein the encoding of the first image into the representation of the first image includes, encoding, by the encoder, each unmasked patch of the first set of patches into a corresponding representation of the respective unmasked patch, thereby generating a first set of patch representations, wherein the encoding the second image into the representation of the second image includes, encoding, by the encoder, each patch of the second set of patches into a corresponding representation of the respective patch, thereby generating a second set of patch representations, wherein the decoding of the transformed representation includes, generating, by the decoder, for each masked patch of the first set of patches, a predicted reconstruction for the respective masked patch based on the transformed representation and the second set of patch representations, and wherein the loss function is based on a metric quantifying the difference between each masked patch and its respective predicted reconstruction.

9. The method of claim 8, wherein the transforming of the representation of the first image into the transformed representation further includes, for each masked patch of the first set of patches, padding the first set of patch representations with a respective learned representation of the masked patch.

10. The method of claim 9, wherein each learned representation includes a set of representation parameters.

11. The method of claim 9, wherein the generating of the predicted reconstruction of a masked patch of the first set of patches includes decoding, by the decoder, the learned representation of the masked patch into the predicted reconstruction of the masked patch, where the decoder receives the first and second sets of patch representations as input data and decodes the learned representation of the masked patch based on the input data, and wherein the method further includes adjusting the learned representations of the masked patches by adjusting the respective set of representation parameters.

12. The method of claim 11 wherein the adjusting the respective set of representation parameters includes adjusting the set of representation parameters based on minimizing the loss.

13. The method of claim 1, wherein fine-tuning the task specific machine learning model includes performing supervised fine-tuning of the task specific machine learning model.

14. The method of claim 13 wherein the supervised fine-tuning includes:

i) applying the task specific machine learning model to one or more annotated images to create output data according to the downstream geometric vision task, wherein the annotated images are annotated with ground truth data for the downstream geometric vision task; and ii) adjusting the task specific machine learning model by adjusting the set of task specific encoder parameters of the task specific machine learning model based on minimizing a task specific loss, the task specific loss being based on a metric quantifying a difference between the created output data and the ground truth data.

15. The method of claim 14 further comprising repeating i) and ii) for a predetermined number of times or until a minimum value of the task specific loss is reached.

16. The method of claim 14 further comprising applying the fine-tuned task specific machine learning model to one or more new images to extract prediction data from the one or more new images for the downstream geometric vision task.

17. The method of claim 16, wherein the downstream geometric vision task is relative pose estimation.

18. The method of claim 17 wherein the applying of the fine-tuned task specific machine learning model includes applying the fine-tuned task specific machine learning model to a new pair of images to extract a relative rotation and a relative translation between the images of the new pair of images as the prediction data,
wherein the images of the pair of new images depict two views of a same scene.

19. The method of claim 16, wherein the downstream geometric vision task is depth estimation.

20. The method of claim 19 wherein the applying of the fine-tuned task specific machine learning model includes applying the fine-tuned task specific machine learning model to one or more new images to extract one or more depth maps from the one or more new images as the prediction data.

21. The method of claim 16, wherein the downstream geometric vision task is optical flow estimation.

22. The method of claim 21 wherein the applying of the fine-tuned task specific machine learning model includes applying the fine-tuned task specific machine learning model to a new image pair including a new first image and a new second image to generate a plurality of pixel pairs as the prediction data,
wherein each pixel pair includes a pixel in the new first image and a corresponding pixel in the new second image,
where the new first and second images depict a same scene under different conditions or from different viewpoints.

23. A computer-implemented machine learning method for generating prediction data according to a downstream geometric vision task, the method comprising:
training a first task specific machine learning model for the downstream geometric vision task using cross-view alignment pre-training of a first machine learning model;
training a second task specific machine learning model for the downstream geometric vision task using cross-view completion pre-training of a second pretext machine learning model;
generating first prediction data according to the downstream geometric vision task by applying the trained first task specific machine learning model to at least one image;
generating second prediction data according to the downstream geometric vision task by applying the trained second task specific machine learning model to the at least one image;
determining a first confidence value for the first prediction data and a second confidence value for the second prediction data; and
generating resulting prediction data according to the geometric vision task by fusing together the first and second prediction data based on the first and second confidence values.

24. A computing system comprising:
one or more processors; and
memory including code that, when executed by the one or more processors, perform to:
perform unsupervised pre-training of a machine learning model, the machine learning model comprising an encoder having a set of encoder parameters and a decoder having a set of decoder parameters,
wherein the performance of the unsupervised pre-training of the machine learning model includes:
obtaining a pair of unannotated images including a first image and a second image,
wherein the first and second images depict a same scene and are taken under different conditions or from different viewpoints;
encoding, by the encoder, the first image into a representation of the first image and the second image into a representation of the second image;
transforming the representation of the first image into a transformed representation;
decoding, by the decoder, the transformed representation into a reconstructed image,
wherein the transforming of the representation of the first image and the decoding of the transformed representation is based on the representation of the first image and the representation of the second image; and
adjusting one or more parameters of at least one of the encoder and the decoder based on minimizing a loss;
construct the task specific machine learning model for the downstream geometric vision task based on the pre-trained machine learning model,
the task specific machine learning model comprising a task specific encoder having a set of task specific encoder parameters;
initialize the set of task specific encoder parameters with the set of encoder parameters of the pre-trained machine learning model; and
fine-tune the task specific machine learning model, initialized with the set of task specific encoder parameters, for the downstream geometric vision task.

* * * * *